United States Patent
Brown et al.

(10) Patent No.: US 6,907,963 B1
(45) Date of Patent: Jun. 21, 2005

(54) BRAKE SYSTEM HAVING HYDRAULIC ACCUMULATOR AND/OR COMBINED SERVICE BRAKE AND PARK AND HOLD BRAKE

(75) Inventors: Donald D. Brown, Thiensville, WI (US); James A. Buckley, Whitefish Bay, WI (US); Scott A. Walterman, Milwaukee, WI (US); Joseph A. Lang, deceased, late of Martinez, GA (US); by Susan R. Lang, legal representative, Martinez, GA (US); Terry Lou Reese, Hephzibah, GA (US); James M. Criscuolo, Columbia, TN (US)

(73) Assignees: Hayes Brake LLC, Mequon, WI (US); Textron Inc., Providence, RI (US)

( * ) Notice: Subject to any disclaimer, the term of this patent is extended or adjusted under 35 U.S.C. 154(b) by 0 days.

(21) Appl. No.: 09/914,867

(22) PCT Filed: Mar. 2, 2000

(86) PCT No.: PCT/US00/05427

§ 371 (c)(1),
(2), (4) Date: Mar. 13, 2002

(87) PCT Pub. No.: WO00/51860

PCT Pub. Date: Sep. 8, 2000

Related U.S. Application Data

(60) Provisional application No. 60/122,405, filed on Mar. 2, 1999.

(51) Int. Cl.[7] .............................................. F16D 55/00
(52) U.S. Cl. ........................ 188/73.31; 74/512; 74/529
(58) Field of Search .............................. 188/71.1, 72.1, 188/74, 77 R, 78, 79.61, 73.31, 106 F, 106 P, 188/265; 74/512, 529

(56) References Cited

U.S. PATENT DOCUMENTS

| | | | |
|---|---|---|---|
| 2,816,633 | A | 12/1957 | Schumann |
| 3,869,027 | A | 3/1975 | Chelbowski |

(Continued)

FOREIGN PATENT DOCUMENTS

| | | |
|---|---|---|
| WO | WO 00/51866 | 8/2000 |

*Primary Examiner*—Chris Schwartz
(74) *Attorney, Agent, or Firm*—Whyte Hirschboeck Dudek SC

(57) ABSTRACT

A hydraulic brake system (50) for a vehicle such as a golf car or the like uses the same brakes (52) and same brake pedal (80) for both service braking and park and hold braking. The brakes (52) are selectively engaged, locked in their engaged position, and released using an integrated control assembly including a brake pedal (80), an accelerator pedal (82), and a brake pedal locking mechanism (84). The brake pedal locking mechanism (84) is configured to automatically latch the brake pedal (80) in a locked position thereof and to automatically unlatch the brake pedal (80) from its locked position upon either subsequent movement of the brake pedal (80) into an overtravel position or subsequent actuation of the accelerator pedal (82). In addition, a hydraulic accumulator (62) stores part of the energy generated upon brake pedal depression and consequent manual actuation of a master cylinder (60) of the system to maintain the brakes (52) in their fully engaged state when the brake pedal (80) is latched. The stored energy can also be used to help return an applied brake pedal (80) to its released position, in which case return fluid flow to the master cylinder (60) is damped to avoid undesirable severe kickback of the brake pedal. The accumulator (62) preferably comprises a modular spring and retainer assembly that can be preassembled separately from the remainder of the system and subsequently mounted on the system as a unit.

31 Claims, 22 Drawing Sheets

U.S. PATENT DOCUMENTS

| | | |
|---|---|---|
| 4,076,093 A | 2/1978 | Mizuno |
| 4,278,149 A | 7/1981 | Gittler .................. 180/282 |
| 4,301,901 A | 11/1981 | Jensen ................ 192/219.6 |
| 4,310,064 A | 1/1982 | Kazarian, Jr. |
| 4,315,441 A | 2/1982 | Fukuda |
| 4,841,798 A | 6/1989 | Porter et al. ........... 74/501.5 R |
| 4,867,289 A | 9/1989 | Wooters |
| 5,020,643 A | 6/1991 | Redenbarger |
| 5,058,462 A | 10/1991 | Killiany et al. |
| 5,309,786 A | 5/1994 | Pare et al. .................. 74/512 |
| 5,588,335 A | 12/1996 | Strait |
| 5,785,156 A | 7/1998 | Warwick et al. |
| 5,890,545 A | 4/1999 | Smith et al. |
| 6,223,865 B1 | 5/2001 | Lang et al. |
| 6,457,568 B2 * | 10/2002 | Lang et al. ............... 188/73.31 |
| 6,648,105 B2 * | 11/2003 | Lang et al. ............... 188/73.31 |
| 6,662,915 B2 | 12/2003 | Bigsby ....................... 188/359 |
| 2001/0040074 A1 | 11/2001 | Lang et al. ............... 188/73.31 |
| 2002/0189909 A1 * | 12/2002 | Buckley et al. ........... 188/73.31 |
| 2003/0010581 A1 | 1/2003 | Lang et al. ............... 188/73.31 |
| 2003/0106754 A1 | 6/2003 | Buckley et al. ............. 188/359 |
| 2003/0164057 A1 * | 9/2003 | Buckley et al. ............... 74/512 |

* cited by examiner

BRAKE SYSTEM HAVING HYDRAULIC ACCUMULATOR AND/OR COMBINED SERVICE BRAKE AND PARK AND HOLD BRAKE

CROSS REFERENCE TO RELATED APPLICATIONS

This application claims the benefit of priority of U.S. Provisional Application Ser. No. 60/122,405, filed Mar. 2, 1999, the entire contents of which are hereby expressly incorporated by reference into the present application.

BACKGROUND OF THE INVENTION

1. Field of the Invention

The invention relates to brake systems and, more particularly, relates to a hydraulic brake system that uses the same brakes and same brake pedal for both service braking and park and hold braking. More particularly, the invention relates to a combined service brake/park and hold brake system having single point latching and/or an integrated brake pedal/accelerator pedal release mechanism. The invention additionally relates to a method of using such a system.

The invention additionally relates to a combined service brake/park and hold brake system having an accumulator that assists in holding the brakes in their engaged position during park and hold braking and that assists in returning the brake pedal to its at-rest position when it is released. The invention additionally relates to a method of using such a system.

2. Discussion of the Related Art

Many vehicles employ a parking brake system or arrangements operative to maintain the service brake(s) of the system in an engaged condition during parking. These "park and hold brake" systems frequently employ a mechanism associated with a primary brake pedal to selectively latch the brake pedal in a locked position in which its brakes are engaged, while enabling brake pedal release when the operator wishes to effect further movement of the vehicle. See, for example, U.S. Pat. Nos. 1,927,209, 1,985,319, 2,551,743, 2,816,333, 4,036,078, 4,218,936, 4,310,064, and 4,867,829. The brakes of most of these systems are operated by depressing the brake pedal and are locked and/or unlocked by operating a secondary pedal or pad located on or near the primary brake pedal. See, for example, U.S. Pat. Nos. 4,306,078 and 4,867,289.

In the case of relatively small utility and recreational vehicles which undergo frequent stopping, such as golf cars and the like, it is particularly important from a safety standpoint to be capable of holding the vehicle in a stopped position when on an upwardly or downwardly inclined grade. For example, safety regulations require that certain vehicles, such as golf cars, be capable of maintaining a braked condition on a 30% grade under full load for a substantial period of time. Most of these small vehicles employ mechanical, cable-actuated brake systems for both service braking and park and hold braking. While these mechanical systems are acceptable for many applications, they exhibit marked disadvantages when compared to hydraulic brake systems of the type employed by most heavy-duty vehicles. For instance, due at least in part to the fact that mechanical brake systems exhibit substantial hysterisis when compared to hydraulic systems, the operator of the typical mechanical brake system must impose a substantial force to the primary brake pedal to effect braking of the typical mechanical brake system, and a similar force is required to actuate an associated brake locking arrangement. These mechanical brake systems also require a relatively large force to release the brake pedal from its locked position. A further disadvantage resulting from the relatively large operating forces required to actuate and/or release mechanical brake systems is the need for high strength structural components to withstand continued service without associated maintenance problems. The key advantage to reducing the brake system hysterisis is braking control. A lower hysterisis system can have its braking torque increased or reduced easily. A higher hysterisis system feels "sticky;".

The park and hold brakes of some small vehicles can be released by selective actuation of either an auxiliary lever or pedal located on or near the brake pedal or by the accelerator pedal. However, brake release in systems of this type typically requires that the accelerator pedal must be depressed through a substantial stroke and/or against substantial resistance to accelerator pedal movement. As a result, the operator must impart so much force to release the brakes that the accelerator pedal is driven through a substantial percentage of its service stroke before the brakes are released, resulting in near-instantaneous and relatively rapid vehicle acceleration upon brake release. The vehicle therefore jerks forward at substantial operator discomfort and at the risk of loss of vehicle control.

The brake pedals of many park and hold brake systems are locked by a dog and detent mechanism that has one or more latching points and that therefore can permit the vehicle's brakes to be locked in a number of progressively-more heavily braked settings. At least the lightest settings of some of these multipoint latching systems might not produce a strong enough holding force to assure adequate braking on steep slopes. This problem can be avoided through the use of a single latching point system that latches the brake pedal at or beyond a location at which the vehicle's brakes lock the wheels from rotation. However, single latching point systems usually exhibit a pronounced snapback effect and high effects to set on the brake pedal (produced by the rapid release of accumulated energy from a fully-engaged brake) that produces an undesirable, relatively loud noise and system hammering and that produces substantial wear and tear on the brake pedal and related components. In some systems, this snap back can be so severe as to risk operator injury.

Another problem associated with systems having either single point latching or multipoint latching is that the latching components of these systems contact one another at several different points in both the latching and unlatching operations, producing several distinct audible clicks that may confuse the operator into believing that the brakes are locked when they are not and/or that the brakes have been released when they are still locked.

Yet another problem associated with known hydraulic combined service brake/park and hold brake systems is that they lack any structure that ensures pressure retention in the brakes in the event of gradual relatively minor pressure reduction in the system. This gradual pressure reduction, generally is known as "creep," may occur, e.g., due to fluid seepage into seals and other elastomeric components of the brake system as well as leakage at metal to metal seal points. Absent some mechanism to make up for the holding energy lost due to creep, the brake holding forces may decrease over time to a level that that risks unintended partial brake release and consequent unwanted vehicle movement.

Thus, a need exists for an economical and reliable brake system 1) which uses the same hydraulic brakes for both service braking and park and hold braking, and 2) which is relatively simple to actuate both to latch and unlatch the brake pedal during park and hold.

The need also exists for either a hydraulic or mechanical park and hold brake system that can be released by actuation of an accelerator pedal with minimal effort on the part of the operator, thereby permitting the operator to "feather" accelerator pedal operation and provide smooth, gradual vehicle acceleration.

There is also a need to store some of the energy generated manually upon actuation of a brake pedal of a hydraulically actuated park and hold brake system and to permit that energy to be released as needed to make up for the minor seal creep that may occur over time.

The need also exists to damp brake pedal return following a braking operation so as to reduce wear on brake system components and to reduce or eliminate operator discomfort associated with pedal snapback and to give the system a quality feel.

SUMMARY OF THE INVENTION

Pursuant to one aspect of the invention, a hydraulic brake system is provided for a vehicle such as a golf car or the like that uses the same brakes and same brake pedal for both service braking and park and hold braking with no auxiliary toggle pedals mounted on the service pedal. The brakes are selectively engaged, locked in their engaged position, and released using an integrated control assembly including a brake pedal, an accelerator pedal, and a brake pedal locking mechanism. The brake pedal locking mechanism, which can also be used with a mechanical; cable-actuated system, is configured to automatically latch the brake pedal in a locked position thereof in a gross overstroking from normal service brake use and to automatically unlatch the brake pedal from its locked position upon subsequent movement of the brake pedal into an overtravel position located beyond its locked position. The assembly may additionally include a kickoff mechanism that couples the accelerator pedal to the brake pedal locking mechanism to unlatch the brake pedal upon actuation of the accelerator pedal. The locking mechanism preferably comprises a single point latching mechanism configured to provide a single audible indication of sufficient brake pedal depression for latching which insures a large reserve hydraulic pressure energy storage and to permit the brake pedal to be unlatched with only a small accelerator pedal stroke and with minimum pressure on the accelerator pedal.

In order to reduce noise and facilitate latching, the system preferably additionally includes a toggle arm which cooperates with the locking mechanism so as to prevent relative contact between first and second components of the locking mechanism until the brake pedal approaches the locked position, thereby providing for the single point latching and the single audible indication.

The locking mechanism may comprise a cam on the brake pedal, a cam follower which is mounted on a swing arm and which engages the cam, a control arm which operatively cooperates with the cam follower, and an over-center spring which operatively communicates with both the cam follower and the control arm and which moves through an over-center position upon movement of the brake pedal into the locked position at the end of the operating stroke, thereby changing a biasing direction thereof from one forcing the cam follower downwardly to one drawing the cam follower upwardly. In this case, the cam is preferably formed on the brake pedal and includes an arcuate portion which is engaged by the cam follower when the brake pedal is in the locked position. In order to facilitate accelerator-pedal base brake pedal release, the cam and the roller are configured such that, during unlatching of the brake pedal, the roller rides along the cam in a path that is at least generally tangential to a pivot arc of the swing arm, thereby facilitating unlatching of the brake pedal by the kick-off mechanism with no force other than friction in the roller, i.e., no further depression of the brake pedal.

Pursuant to another aspect of the invention, a method of applying and holding a brake of a vehicle comprises manually driving a brake pedal to pivot from an at-rest position and into an operating position, then manually driving the brake pedal through the operating position and to a locked position in which a locking mechanism latches the brake pedal in the locked position, then upon releasing the force of the brake pedal, the brake pedal remains in its locked position, and then unlatching the brake pedal from the locked. The unlocking step is performed by selectively and alternatively 1) manually driving the brake pedal to an over-travel position which is located beyond the locked pedal position and in which the locking mechanism automatically unlatches the brake pedal, and 2) manually driving an accelerator pedal into engagement with a kick-off mechanism to automatically manipulate the locking mechanism to unlatch the brake pedal. The unlocked pedal is then permitted to return to the at-rest position.

Preferably, the brake pedal is latchable in only a single locked position thereof, and the locking mechanism provides a single audible indication to an operator that the brake pedal has been depressed sufficiently to be latched in the locked position.

Pursuant to yet another aspect of the invention, a method of operating a brake system of a vehicle is provided via which a latched brake pedal can be released with an accelerator pedal with minimal operator effort. Preferably, the accelerator pedal and brake pedal locking mechanism interact such that brake pedal release imparts 1.0 lbs of resistance, and preferably no more than 0.5 lbs of resistance, to accelerator pedal movement.

Pursuant to still another aspect of the invention, a hydraulic brake system is provided for a vehicle such as a golf car or the like that uses the same brakes and same brake pedal for both service braking and park and hold braking. The system includes a master cylinder, a hydraulic accumulator, and a brake pedal. The master cylinder generates hydraulic pressure directly in response to manual operation of the brake pedal and transmits that pressure to the vehicle's brakes. The accumulator stores energy generated by the master cylinder during a portion of the brake pedal actuating stroke. The stored energy can be used to maintain the brakes in their fully engaged state, even in the event of "creep" or partial fluid pressure loss which may occur, e.g., as a result of long term deflection in elastomeric components of the brake system. The stored energy can also be used to help return an applied brake pedal to its released position, in which case return fluid flow to the master cylinder is damped to avoid undesirable severe kickback of the brake pedal. The accumulator preferably comprises a modular spring and retainer assembly that can be preassembled separately from the remainder of the system and subsequently mounted on the system as a unit. The spring preferably is preloaded so as to set a threshold pressure below which at least substantially all work performed by the master cylinder in normal service braking is applied toward hydraulic pressure intensification and above which most of the work performed by the master cylinder is applied towards accumulator spring compression and energy storage.

Preferably, the brake pedal is damped during it return stroke using a one-way restrictor or a damping grease or both. The preferred one-way restrictor permits unrestricted fluid flow from the master cylinder to the accumulator and inhibits return fluid flow from the accumulator to the master cylinder. A suitable one-way restrictor comprises a valve element which, when in a seated position thereof, provides a convoluted flow path from the accumulator to the master cylinder. This flow path may, for example, be a spiral path formed at least in part by a spiral groove in a face of the valve element.

The system may comprise an actuator rolling pin which is mounted on the brake pedal and which is operable, upon brake pedal actuation, to translate a piston of the master cylinder to actuate the master cylinder. In this case, actuator rolling pin preferably is adjustably mounted on the brake pedal so as to eliminate any dead space between the actuator pin and the master cylinder piston.

In accordance with still another aspect of the invention, a method of energizing a hydraulically actuated service brake of a vehicle and holding the brake in its engaged condition includes driving a brake pedal through an actuation stroke to manually actuate a master cylinder to generate hydraulic pressure. During a first phase of the actuation stroke, at least substantially all work performed by the master cylinder is applied toward hydraulic pressure intensification, and wherein, during as second phase of the actuation stroke, at least a portion of the work performed by the master cylinder is applied towards energy storage in a hydraulic accumulator. The brake pedal is then latched in a locked position in the second phase of the actuation stroke to hold the service brake in its engaged condition with the assistance of stored energy from the accumulator.

Preferably, a transition point between the first and second phases of the actuation stroke occurs well after a brake lock-up point of the actuation stroke.

As a result of spring preload in the accumulator, a rate of increase of resistance to additional pedal actuation is substantially higher in the first phase of the actuation stroke than in the second phase. The low rate of increase facilitates brake pedal latching by reducing the effort required by the operator to depress the brake pedal to its locked position.

In accordance with still another aspect of the invention, brake system fabrication and installation are greatly facilitated by forming a master cylinder of the system and a hydraulic accumulator of the system as a single integrated assembly.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

Pursuant to one aspect of the invention, a hydraulic brake system is provided for a vehicle such as a golf car or the like that uses the same brakes and same brake pedal for both service braking and park and hold braking. The brakes are selectively engaged, locked in their engaged position, and released using an integrated control assembly including a brake pedal, an accelerator pedal, and a brake pedal locking mechanism. The brake pedal locking mechanism is configured to automatically latch the brake pedal in a locked position thereof and to automatically unlatch the brake pedal from its locked position upon subsequent movement of the brake pedal into an overtravel position located beyond its locked position. The assembly additionally includes a kick-off mechanism that couples the accelerator pedal to the brake pedal locking mechanism to unlatch the brake pedal upon actuation of the accelerator pedal. The locking mechanism preferably comprises a single point latching mechanism configured to provide a single audible indication of brake pedal latching and to permit the brake pedal to be unlatched with only a small accelerator pedal stroke and with minimum pressure on the accelerator pedal.

The system additionally includes a hydraulic accumulator that stores much of the energy generated upon brake pedal depression. The stored energy can be used to maintain the brakes in their fully engaged state, even in the event of "creep" or partial fluid pressure loss which may occur, e.g., as a result minor seal creep of elastomeric components of the brake system. The stored energy can also be used to help return an applied brake pedal to its released position, in which case return fluid flow to the master cylinder is damped to avoid undesirable severe kickback of the brake pedal. The accumulator preferably comprises a modular spring and retainer assembly that can be preassembled separately from the remainder of the system and subsequently mounted on the system as a unit.

2. System Overview

The invention, particularly various components thereof, is applicable to virtually any light-duty vehicular braking application and even to many medium-duty and heavy-duty applications. It is particularly well suited for use on vehicles whose brakes are subjected to a high-duty cycle under relatively extreme environmental conditions. It will therefore be described in conjunction with a golf car, although it be understood that it is applicable to a wide variety of other applications as well.

Figure 1:
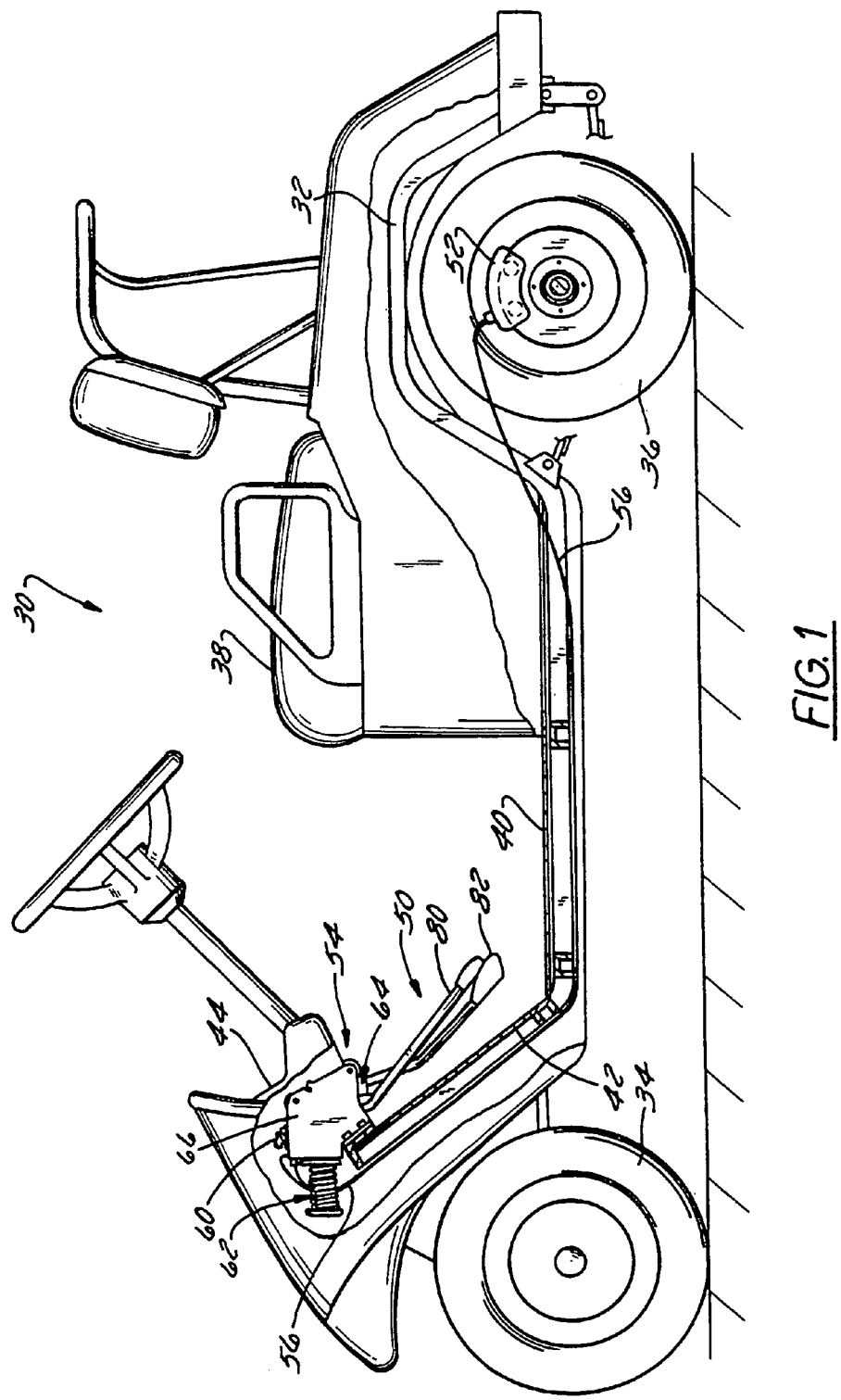
FIG. 1 is a somewhat schematic cutaway side-elevation view of a golf car employing a hydraulic brake system constructed in accordance with a preferred embodiment of the invention.
Figure 2:
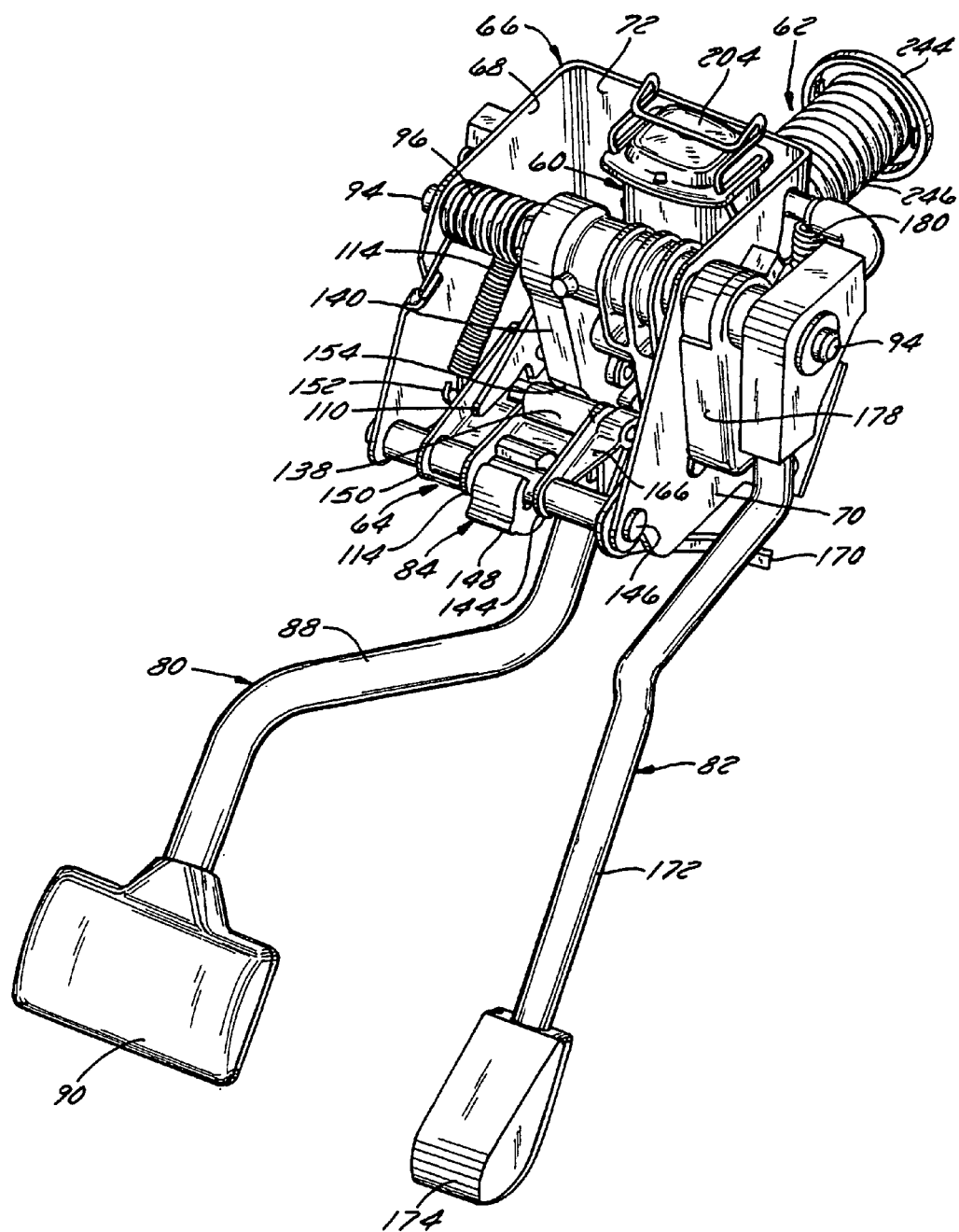
FIG. 2 is a perspective view of a brake actuator and release assembly of the brake system of FIG. 1.
Figure 3:
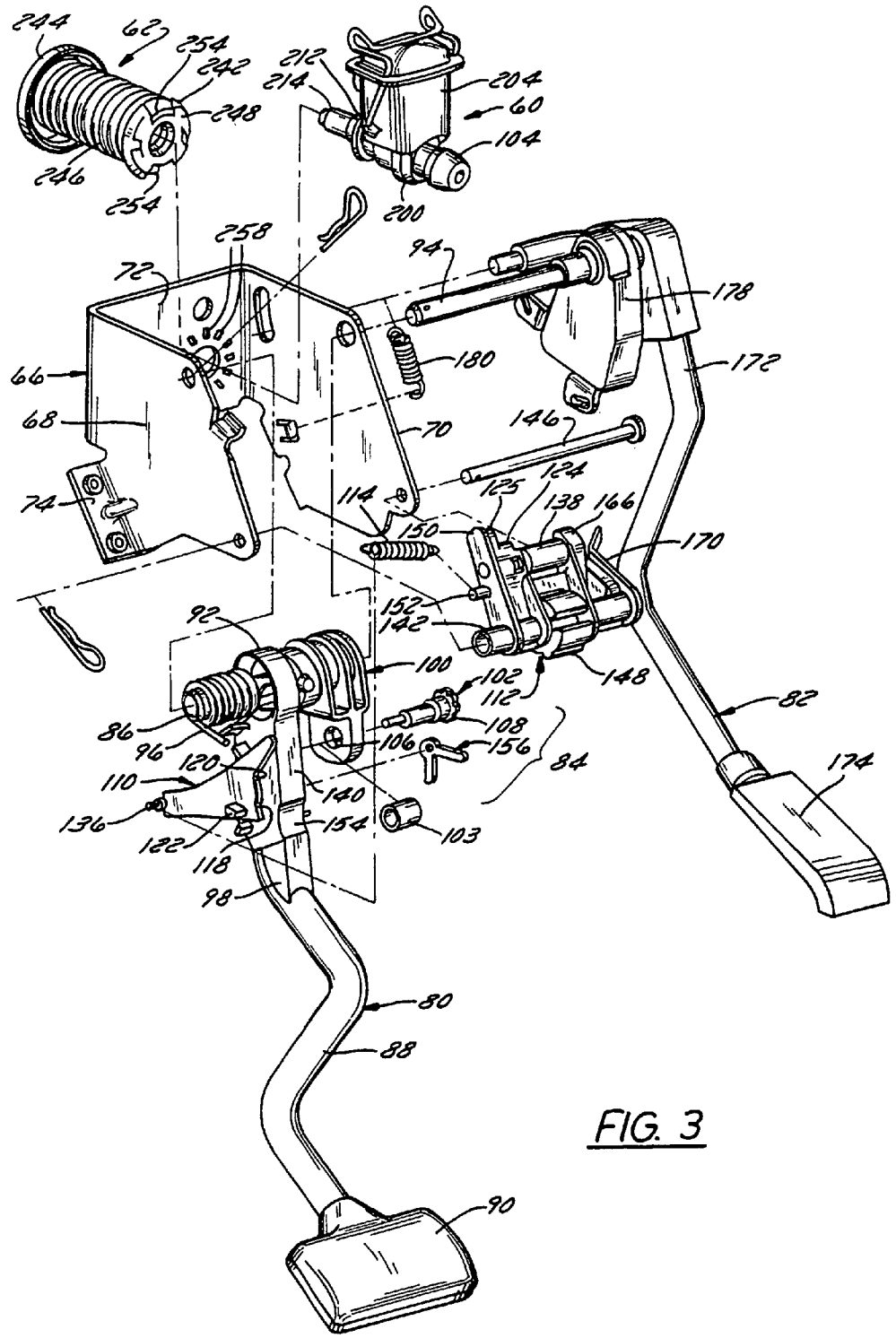
FIG. 3 is an exploded perspective view of the assembly of FIG. 2.
Figure 4:
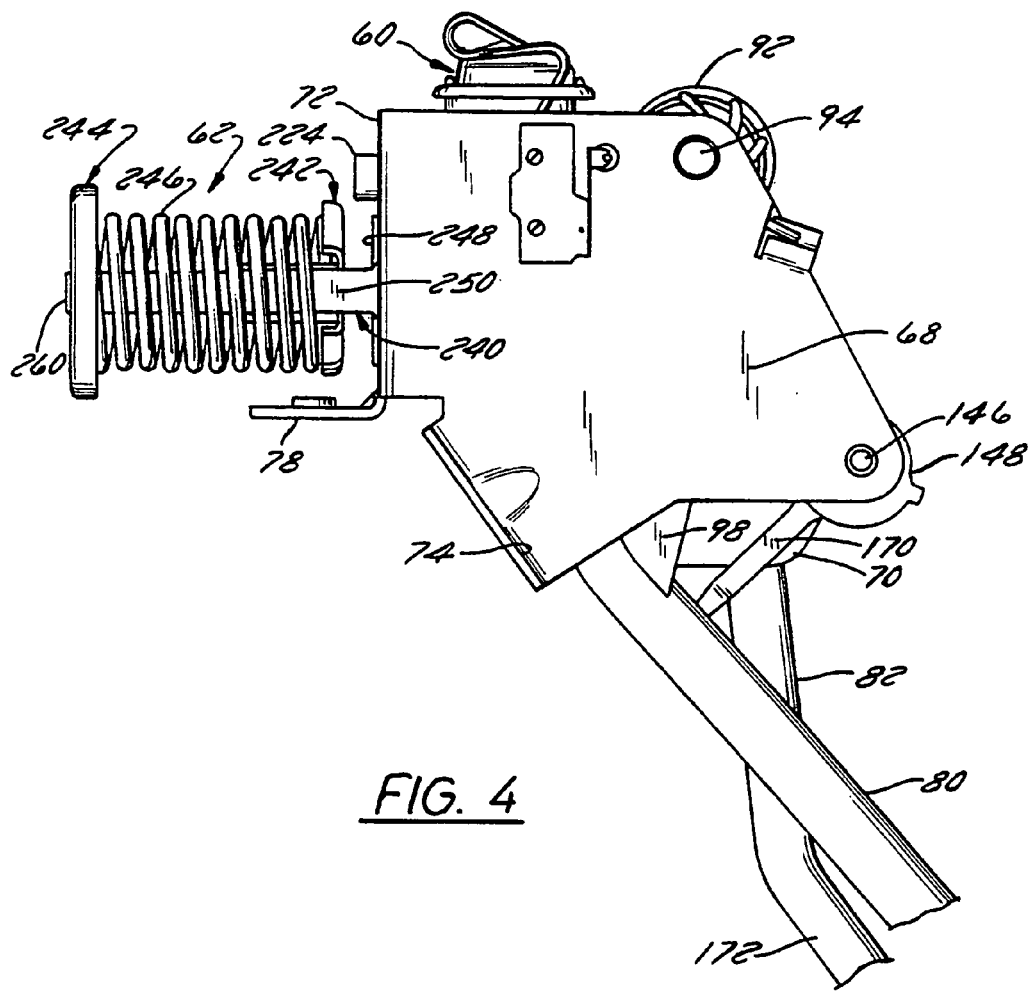
FIG. 4 is an outboard side-elevation view of the assembly of FIG. 2.
Figure 5:
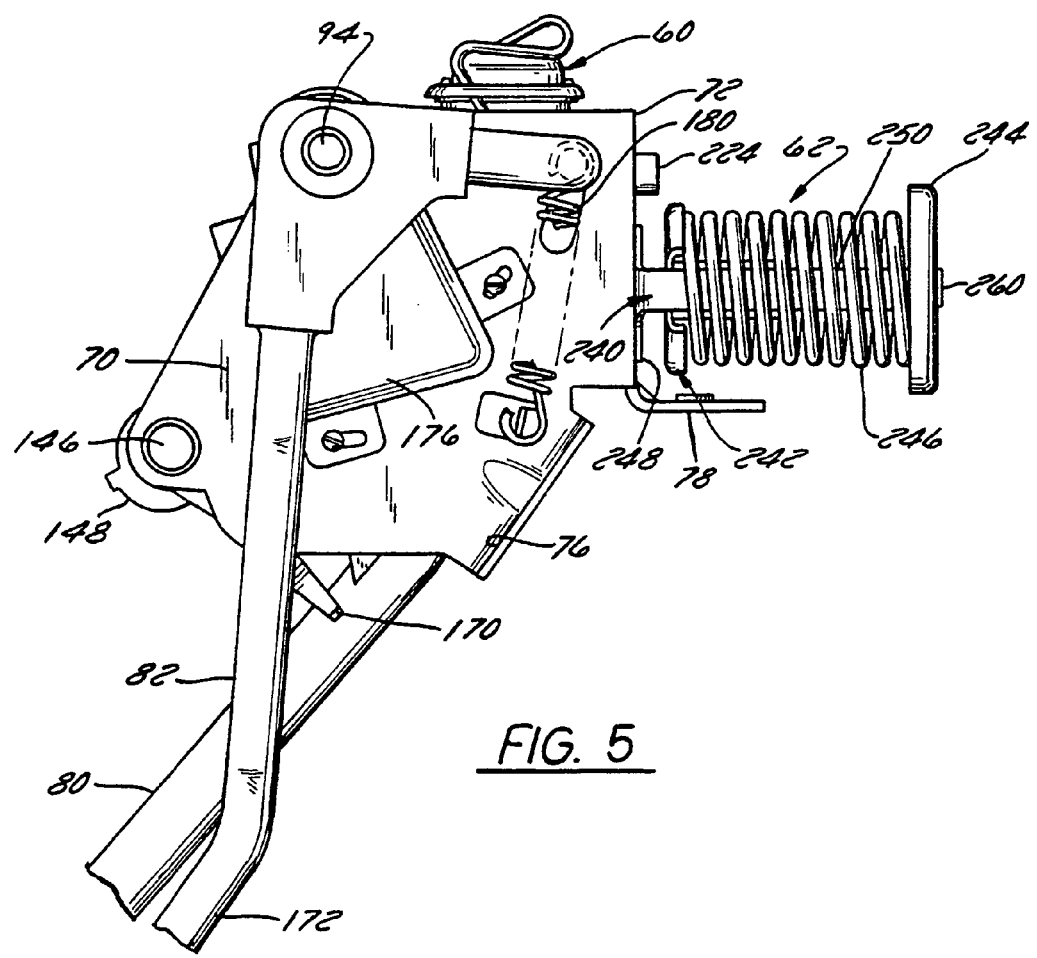
FIG. 5 is an inboard side-elevation view of the assembly of FIG. 2.

Referring now to FIG. 1, a golf car 30 to which the invention is applicable includes a vehicle chassis 32 supported on front and rear wheels 34 and 36 and supporting an operator's seat 38. A floorboard 40 extends forwardly from the operator's seat 38 and terminates at a sloped front wall 42 that extends upwardly to a location beneath a front cowling 44. At least the rear wheels 36 are braked by a hydraulic brake system 50 that is used both for service braking and for park and hold braking. This hydraulic brake system 50 exhibits many advantages over conventional systems having a separate mechanical parking brake and a hydraulic service brake. First, it eliminates the need for two separate brake pedals, thereby substantially reducing costs and facilitating operation. Second, unlike mechanical systems, hydraulic systems can be reliably self adjusting. Third, because braking effectiveness generally is proportional to braking frequency, combining the park and bold brake with the service brake substantially improves parking braking efficiency. Fourth, less force is required to properly set and bold a hydraulic brake than a comparable cable actuated brake due to the lower hysterisis in the hydraulic brake system. As a result, system 50 requires less force for selecting either the service or parking modes verses a mechanical system which requires greater force to properly engage a service or parking mode. Fifth, because the hydraulic fluid used in a hydraulic brake system is a totally sealed system, the system is not generally subject to segregation. Finally, the operator experiences a much more pleasant, controlled braking experience than is generally associated with a cable actuated mechanical brake.

Still referring to FIG. 1, major components of the brake system 50 include 1) a plurality of brakes 52 (one of which is associated with at least each of the rear wheels 36, and possibly other wheels as well), 2) a brake actuator and release assembly 54, and 3) brake lines 56 connecting the brake actuator and release assembly 54 to the brakes 52. The brakes 52 may comprise either drum brakes or disc brakes, so long as they are hydraulically actuated.

The brake actuator and release assembly 54 is configured to selectively generate hydraulic fluid pressure in the brake lines 56 to apply the brakes 52. The hydraulic brake fluid used for this purpose may comprise any fluid used in braking systems. It is preferably a non-hygroscopic fluid.

Figure 26:
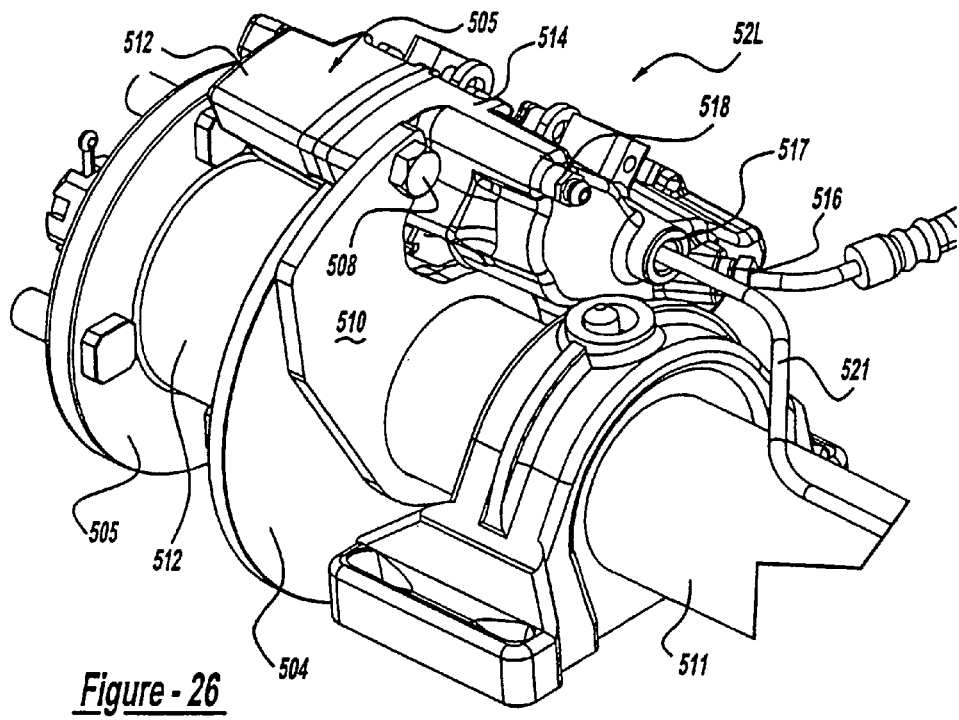
FIG. 26 is a perspective view of a left caliper and hub assembly usable with the vehicle and brake system of FIG. 1.

The brake system 50 is designed to not experience any leakage during the life of the system, even if the brakes 52 are locked in the engaged positions for prolonged periods at high pressures on the order of 750 psi or above. This pressurization exceeds internal hydraulic fluid pressure typically utilized in conventional hydraulic braking systems, particularly at rest. In order to ensure that such positive sealing is achieved in the face of the relatively high static hydraulic pressures present in the brake system 50 when the brakes 52 are engaged, elastomeric seals may be used in place of metal-to-metal contact on all sealing surfaces, including on the system's air bleeder valves. Hydraulic brake system 10 also provides a positively-sealed, pressurized hydraulic brake system. In a parking mode, hydraulic brake system 10 generates approximately 750 pounds per square inch (PSI).The system 50 is preferably filled by first pulling a vacuum on the entire braking system to check for leaks, and thereafter filling the system with the brake fluid. This technique of pulling a vacuum on a brake system and then filling it has the benefit of purging air from the system, thus reducing possible oxidative damage and soft brake pedal. FIGS. 26–30 show a preferred embodiment of a caliper assembly of a representative brake 52 usable in the system 50 and its interconnection to the vehicle 30. FIG. 26 shows a left brake 52 which is composed of the integral hub and rotor assembly 502 which has a rotor portion 504 and a wheel hub portion 505. Brake 52 further has a caliper assembly 506 which is attached by two through bolts 508 to affixed flange 510 rigidly mounted to the rear axle housing 511.

Caliper assembly 506 has a caliper outboard half subassembly 512 and a caliper inboard half subassembly 514. Caliper inboard half 514 has an input fluid port 516 for receiving fluid from the hydraulic brake line 521 and a fluid output port 517 for providing fluid to the right brake 52R (see FIG. 27). Caliper inboard half subassembly 514 has a bleeder valve 518 for bleeding air from the brake lines 521 during repair or installation.

Figure 27:
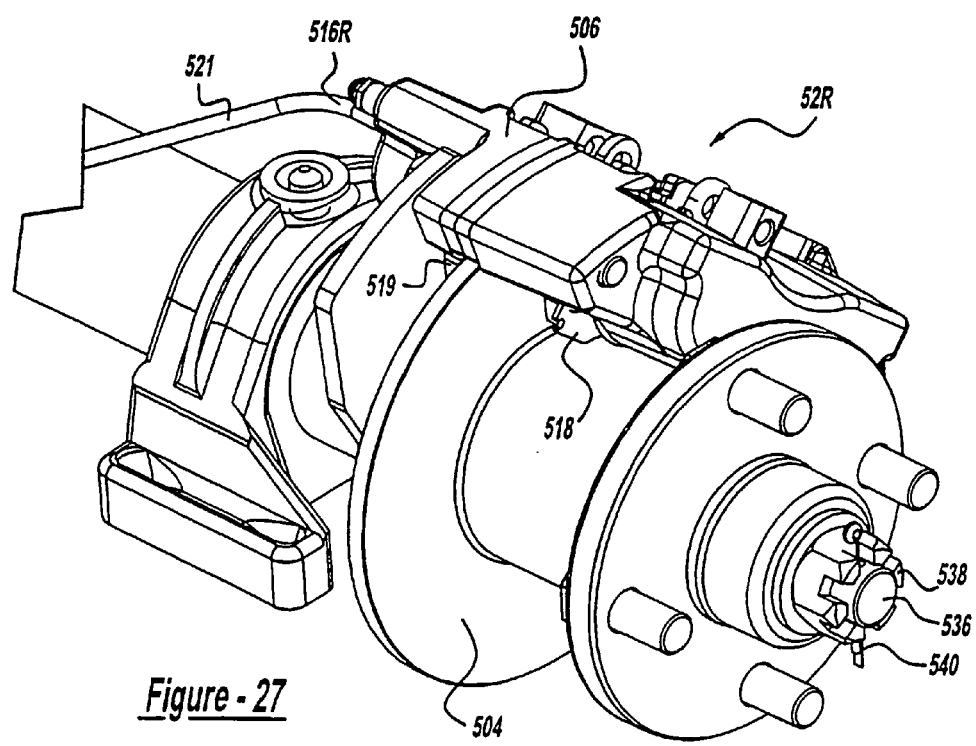
FIG. 27 is a perspective view of a right caliper and hub assembly usable with the vehicle and brake system of FIG. 1.

FIG. 27 shows a right brake 52R, which is composed of the same components as those shown in the left brake assembly 52L of FIG. 26, in mirror image form. Caliper assembly 506 holds a pair of brake pads 518 and 519 adjacent to rotor 504 of the integrated hub and rotor assembly 502. Pads 518 and 519 move in response to hydraulic force generated by fluid under pressure applied to input port 516R. The integrated hub and rotor assembly 502 is held onto drive shaft 536 by a hex castle nut 538 and cotter pin 540.

Figure 28:
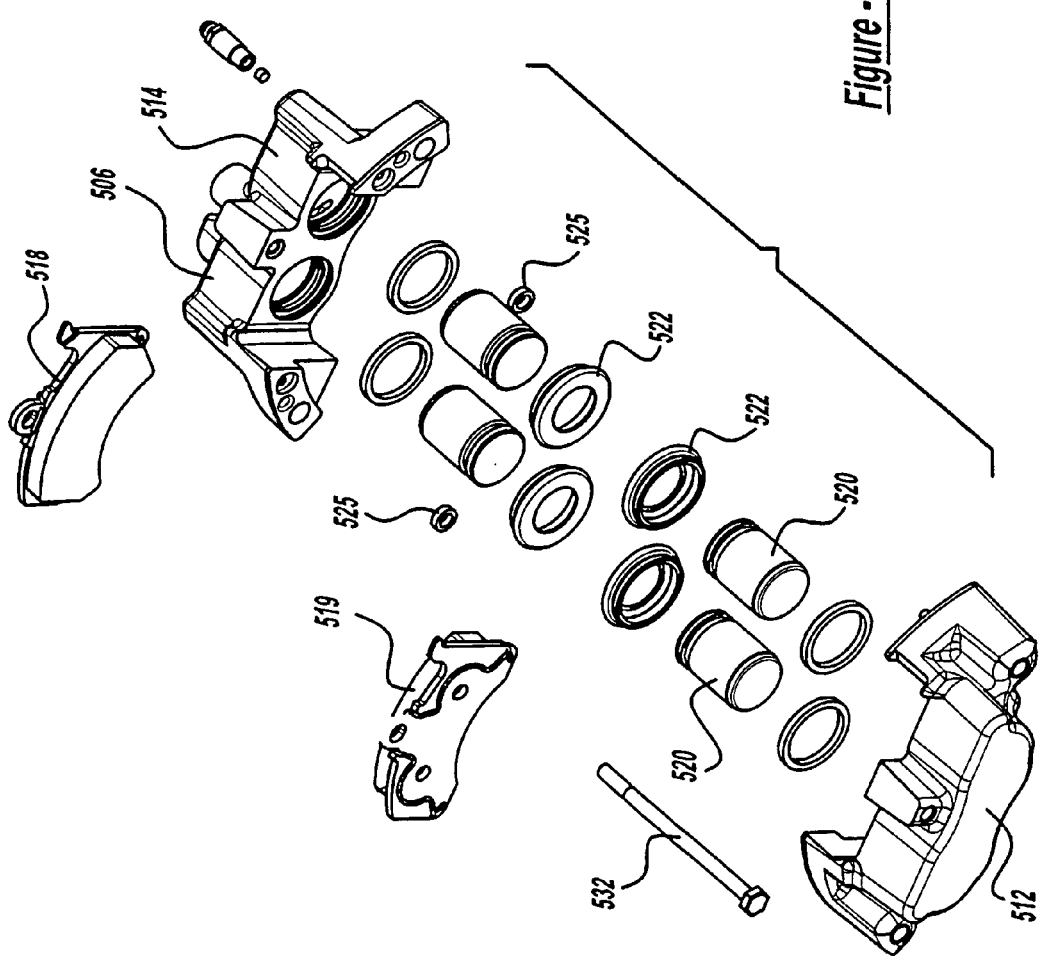
FIG. 28 is an exploded perspective view of the caliper of the assembly of FIG. 26.

FIG. 28 shows an exploded view of caliper assembly 506, which reveals that the caliper inboard half subassembly 514 and caliper outboard half subassembly 512 each have a pair of piston actuators 520. Each actuator has a conventional polymeric outside seal 522, which elastically deforms when the pistons are moved forwardly to press against the brake pads 518 and 519, and which undeform to pull the piston away from the rotor portion 504 when the fluid pressure is removed. Between the halves of the caliper 506 is a pair of conventional elastomeric O-rings 525 which function to help prevent leakage of hydraulic fluid moving through internal passages within each half sub assembly 512 and 514 and between the halves of the caliper 506. Disposed immediately adjacent the O-rings 225 is a pair of through holes 528 for accepting through mounting bolts 530 (not shown in FIG. 28). Also shown is through bolt 532 which functions to secure brake pads 519 and 518 in their proper alignment with the rotor portion 504. Wire spring clips 542 and 544 generally are further provided to hold the brake pads in place.

Figure 29:
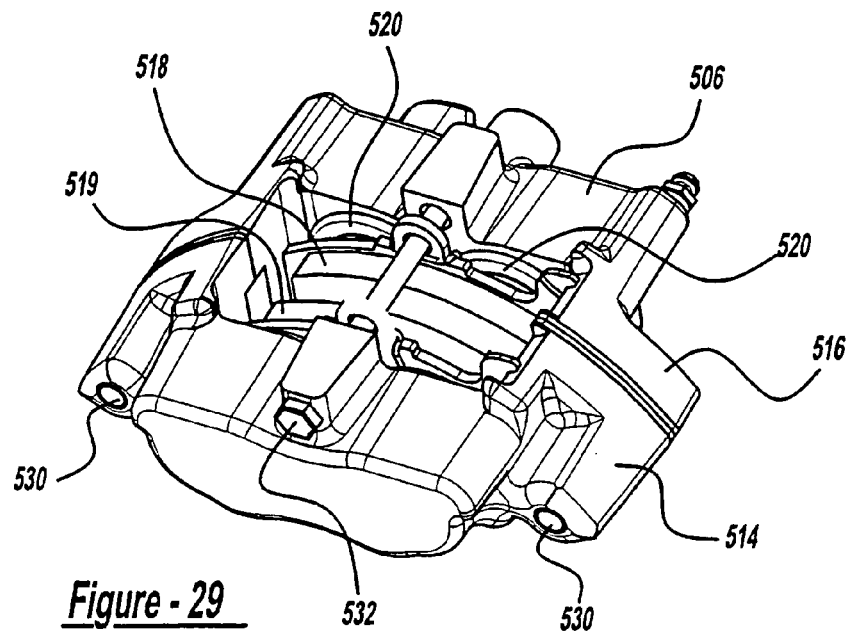
FIG. 29 is a perspective view of the caliper of FIG. 28.

FIG. 29 is a perspective view of caliper assembly 506 of the current invention. Shown are the through bolts 530 which function to hold the caliper inboard half subassembly 514 and caliper outboard half subassembly 516 together. Also shown are through bolts 532 holding the brake pads 518 and 519 in proper position between the piston actuators 520.

Figure 30:
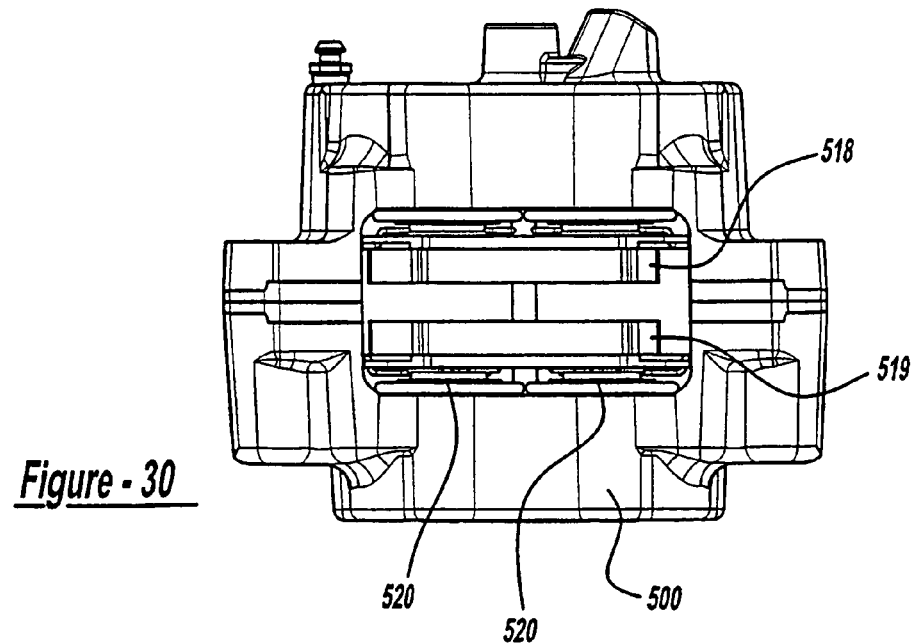
FIG. 30 is a bottom plan view of the caliper of FIG. 29.

FIG. 30 shows a bottom view of the caliper brake assembly 500. Shown is the relationship of the pads 518 and 519 with the actuating pistons 520. As can be seen, the pads 518 and 519 define a space wherein the rotor portion 504 is located.

Figure 31:
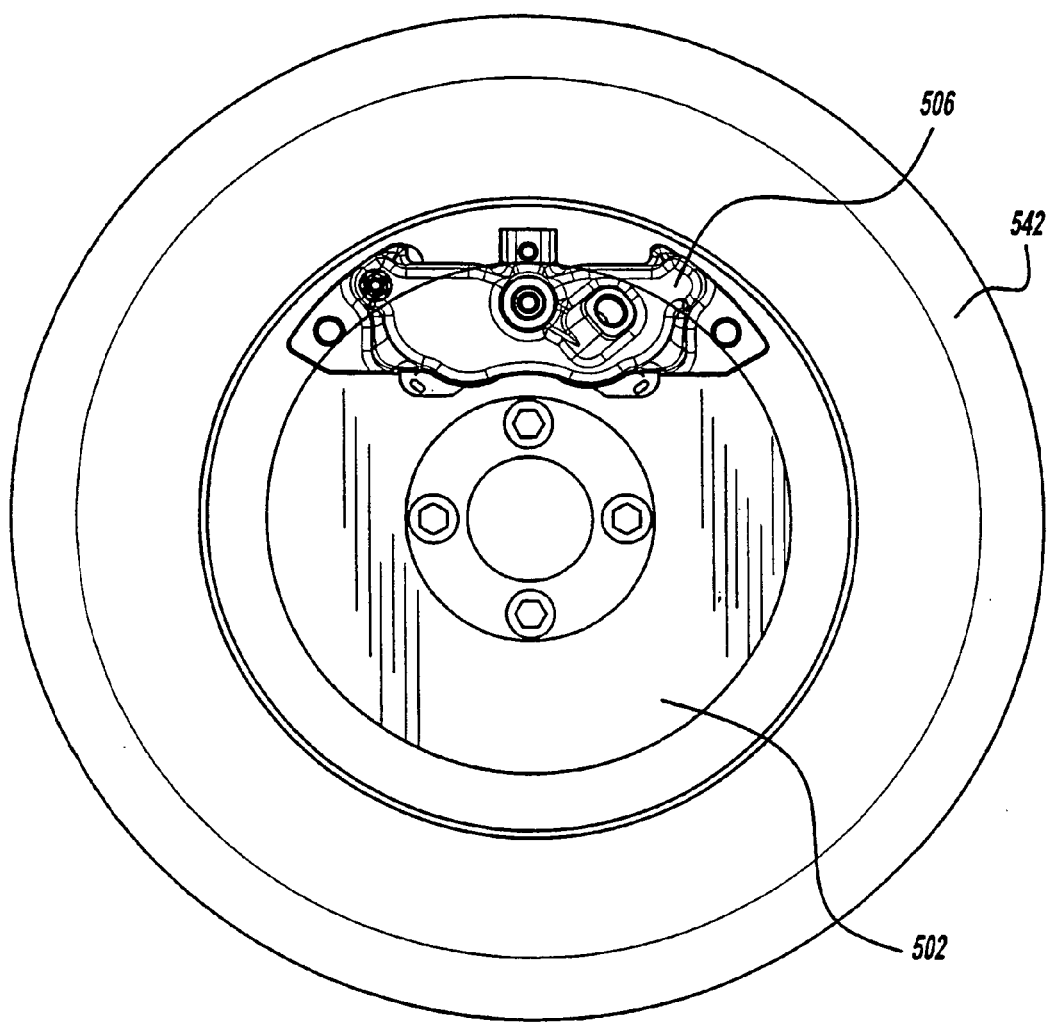
FIG. 31 is a side elevation view of an integral wheel hub and rotor assembly employing caliper and hub assembly of FIG. 26

FIG. 31 is a diagram of the integral wheel hub and rotor assembly with caliper disposed within the small diameter of the golf cart wheel 542. As can be seen, the low profile caliper 506 can fit within the small diameter of the golf cart wheel. The lower profile of the caliper 506 allows for incorporation of a disk brake system onto a golf car or the like.

Still referring to FIG. 1, the entire brake actuator and release assembly 54 is configured as a modular unit mounted above the floorboard 40 and at least partially beneath the front cowling 44. It therefore lacks any underhanging components that extend beneath the floorboard 40. This configuration is advantageous for several reasons. For instance, there is no risk that any components of the brake system 50 will be damaged by obstructions over which the vehicle 30 may travel. Moreover, the system's components are isolated from corrosive substances over which the vehicle may travel such as water, fertilizers, etc.

Referring now to FIGS. 1–6, the brake actuator and release assembly 54 includes as its major components 1) a master cylinder 60, 2) a hydraulic accumulator 62, and 3) an integrated brake pedal and accelerator pedal assembly 64. All of these components are mounted on a common support bracket 66 that is formed from a single metal stamping. As best seen in FIGS. 2–6, the support bracket 66 has an open rear end, inboard and outboard sidewalls 68 and 70, and a front wall 72 connecting the sidewalls 68 and 70 to one another. Mounting flanges 74, 76, and 78 extend outwardly from the sidewalls 68 and 70 and the front wall 72 for connection to a support such as the front wall 42 of the operator's compartment.

The integrated brake pedal and accelerator pedal assembly 64 and the hydraulic accumulator 62 can be used either in combination or independently of one another and are applicable to the illustrated brake system 50 as well as to a variety of other systems. Each of these components will be described in turn.

3. Integrated Brake Pedal and Accelerator Pedal Assembly
   a. Construction of Integrated Brake Pedal and Accelerator Pedal Assembly The integrated brake pedal and accelerator pedal assembly 64 is usable with the hydraulic brake system 50 as well as a more traditional mechanical cable-actuated brake system. It includes a brake pedal 80, an accelerator pedal 82, and a locking mechanism 84. The assembly 64 can perform several distinct functions. First, the brake pedal 80 can be actuated to perform a service braking operation. Second, the locking mechanism 84 can latch the brake pedal 80 in a locked, actuated position to hold the service brakes 52 in their engaged position. Third, the brake pedal 80 can operate, in conjunction with the accumulator 62, to facilitate brake pedal latching and store energy to help assure that the brakes 52 will remain in their locked position despite creep that may occur within the system. Fourth, the locking mechanism 84 can be released using either the brake pedal 80 or the accelerator pedal 82 without actuating any secondary brake release mechanism.

Figure 6:
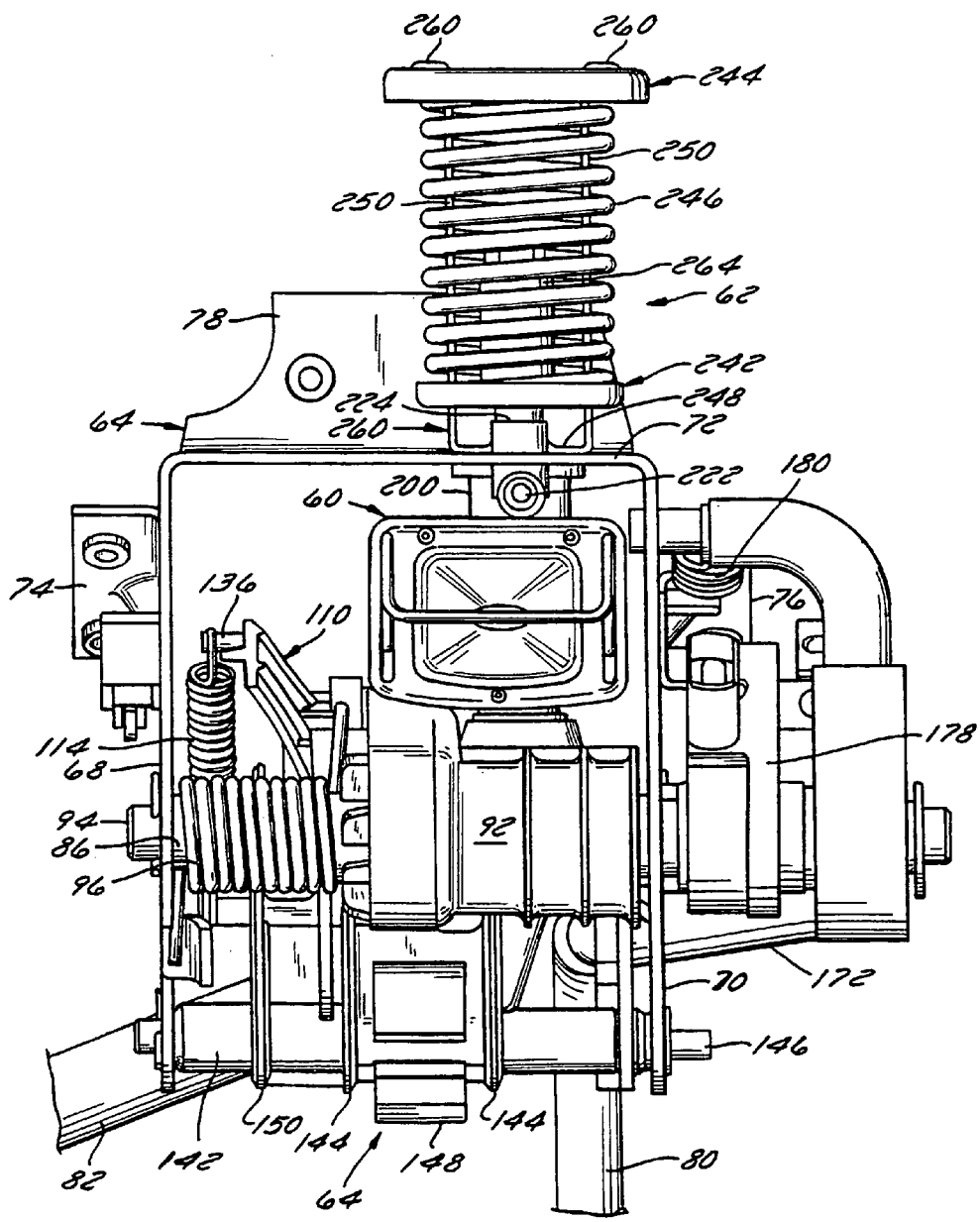
FIG. 6 is a top plan view of the assembly of FIG. 2.
Figure 15:
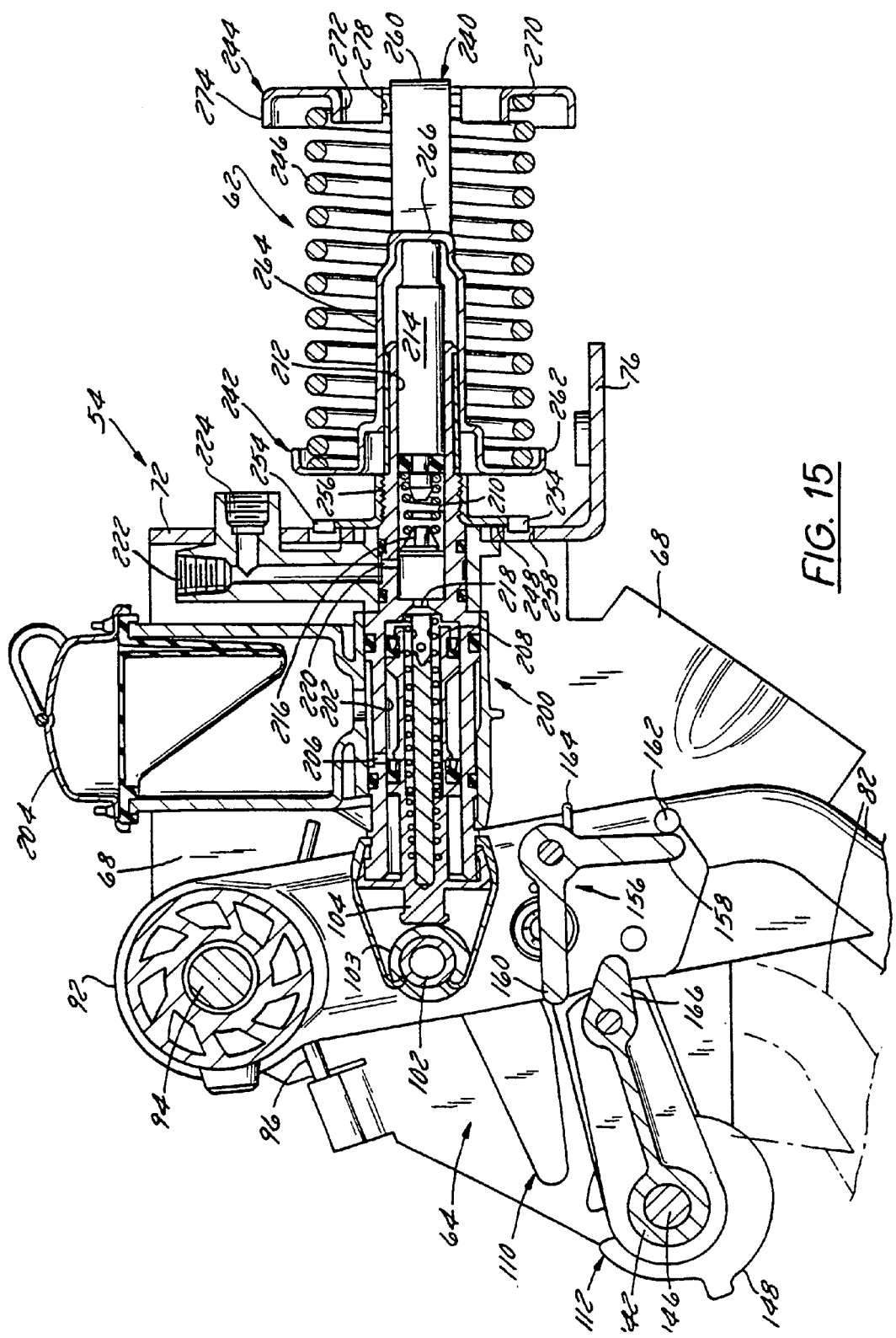
FIG. 15 is a sectional side-elevation view showing the assembly of FIG. 2 in a position in which an accumulator thereof is energized.
Figure 16:
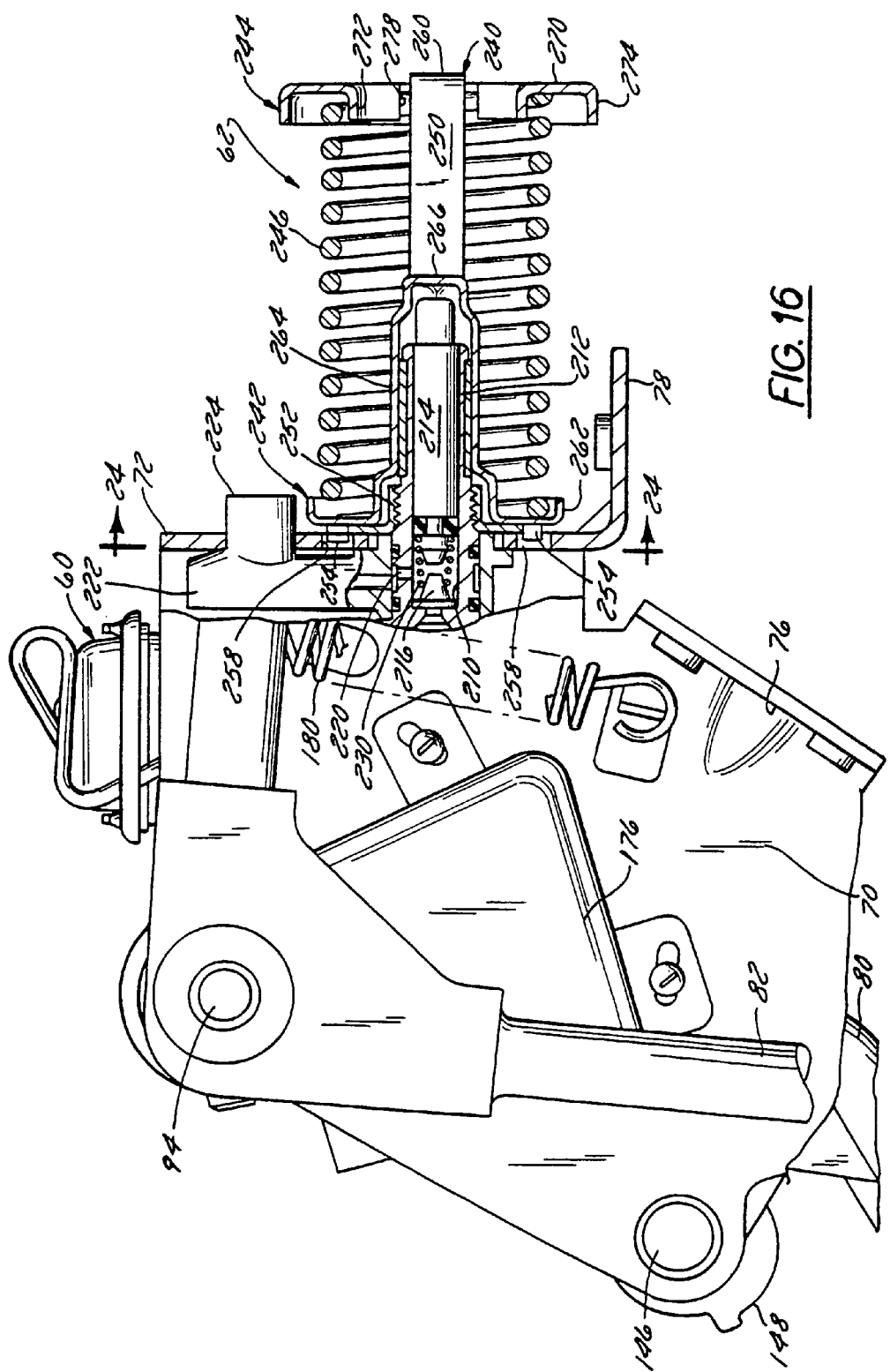
FIG. 16 is fragmentary sectional side view generally corresponding to FIG. 15 and illustrating the accumulator in its de-energized position.

The brake pedal 80 includes a pivot shaft 86, a lever arm 88 extending downwardly from the pivot shaft 86, and a pad 90 mounted on the bottom end of the lever arm 88. As best seen in FIGS. 6, 15, and 16, the pivot shaft 86 is mounted on a plastic sleeve 92 so as to be rotatable with respect thereto, and the plastic sleeve 92 is, in turn, mounted on a main pivot shaft 94. Shaft 94 is rotatably supported on the support bracket 66 and also serves as the pivot shaft for the accelerator pedal 82 (discussed below). The pivot shaft 86 is lubricated via a synthetic damping grease injected into the space between the pivot shaft 86 and the plastic sleeve 92. The damping grease preferably that comprises one that exhibits good lubrication characteristics at low rotational velocities but that actually serves to damp or inhibit shaft rotation at higher rotational velocities. The preferred grease is NYE PG-44A, which is manufactured by Nye Lubricants, Inc. of New Bedford, Mass. This grease is an extremely stiff consistency, inorganically gelled, water resistant, rust-inhibited damping grease based on a high molecular weight polymeric-base oil. The lever arm 88 preferably is formed from steel encased in a plastic sleeve (not shown) in order to protect the steel from corrosion. The pad 90 may comprise any suitable foot actuated pad mounted on the end of the lever arm 88. A torsion spring 96, serving as a brake pedal return spring, is mounted on the pivot shaft 86 on one side of the lever arm 88. In addition, a plastic block 98 is mounted on the upper surface of the lever arm 88 to form part of the lock mechanism 84 as detailed below.

Referring particularly to FIGS. 3 and 12–16, a master cylinder actuating pin support arm 100 is mounted on the pivot shaft 86 adjacent the inboard side of the lever arm 88 so as to rotate with the lever arm 88. An actuating pin 102 is mounted on the support arm 100 so as to rotate with the pivot shaft 86. The pin 102 is coupled to a main piston 104 of the master cylinder 60 (detailed in Section 4 below) via a roller 103 and a strap 105 so that the brake pedal 80 and master cylinder piston 104 always move together as illustrated in FIG. 15. The actuating pin 102 comprises an eccentric pin that is mounted in an aperture 106 in the support arm 100 so as to extend laterally toward the brake lever arm 88. A head 108 on the pin 102 can be rotated to rotate the thicker portion of the eccentric pin 102 either towards or away from the master cylinder main piston 104, thereby eliminating any play or dead space between the brake pedal 80 and the master cylinder main piston 104 after assembly of all components.

The locking mechanism 84 is operable to automatically latch the brake pedal 80 in its locked position upon depression of the brake pedal 80 to a latch point and to automatically unlatch the brake pedal 80 from its locked position to release the brakes 52 upon brake pedal overtravel beyond the latch point. The locking mechanism 84 also is configured to release the brake pedal 80 under power of the accelerator pedal 82. The locking mechanism 84 may comprise any structure having at least one of 1) single point latching capability, 2) the ability to release the brakes 52 upon brake pedal overtravel beyond its latched position, and 3) a kickoff mechanism that permits accelerator pedal release of the brake pedal 80. The illustrated locking mechanism 84 includes the block 98 on the brake pedal lever arm 88, a control arm 110 pivotally mounted on the brake pedal 80, a swing arm 112 pivotally mounted on the support bracket 66, and an over-center spring 114 that is coupled to the control arm 110 and to the swing arm 112 so as to bias the swing arm 112 downwardly during service braking and to bias the swing arm 112 upwardly during a latch and release cycle.

Figure 7:
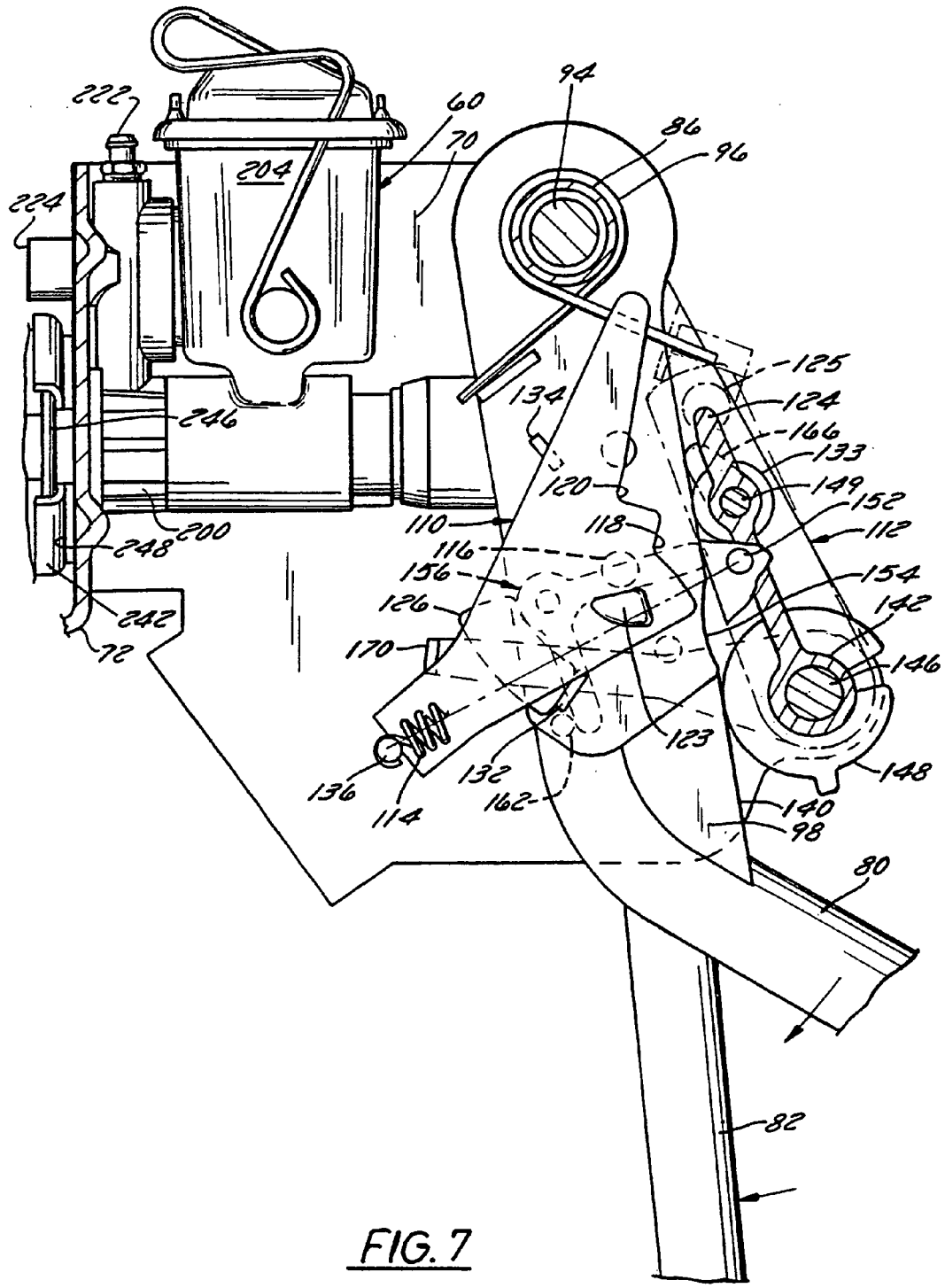
FIGS. 7–11 are outboard side-elevation views of a portion of an integrated brake pedal and accelerator pedal subassembly of the assembly of FIG. 2, illustrating a sequence of a braking operation including service braking, brake pedal latching, and brake pedal release.
Figure 8:
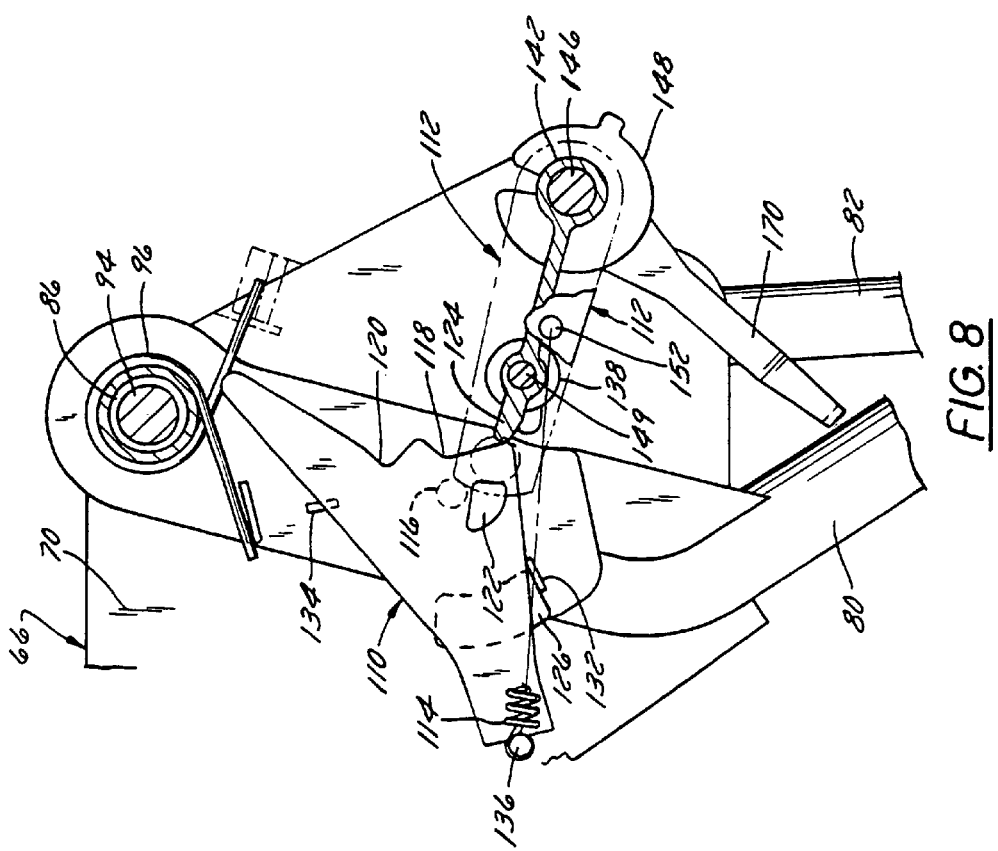
Figure 9:
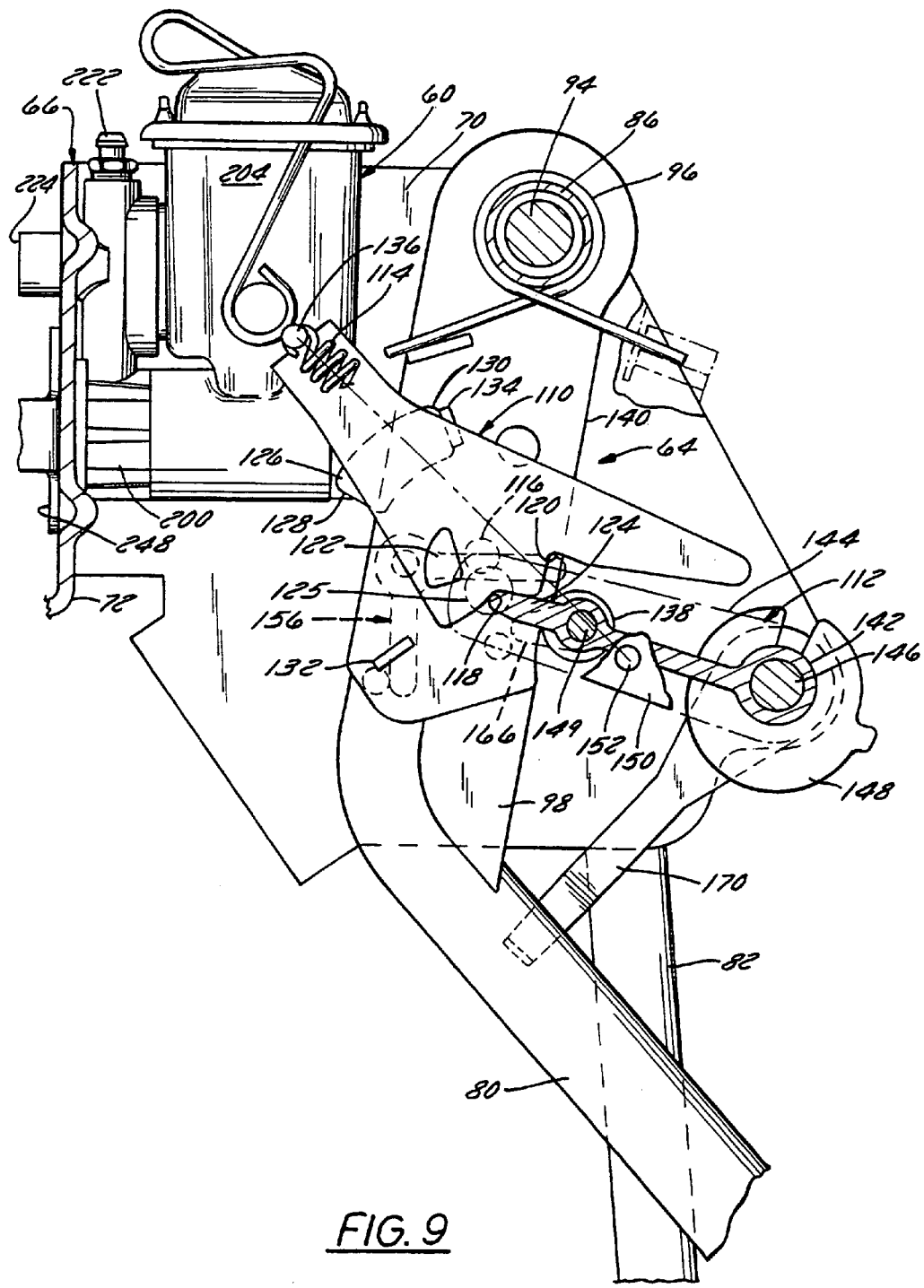
Figure 11:
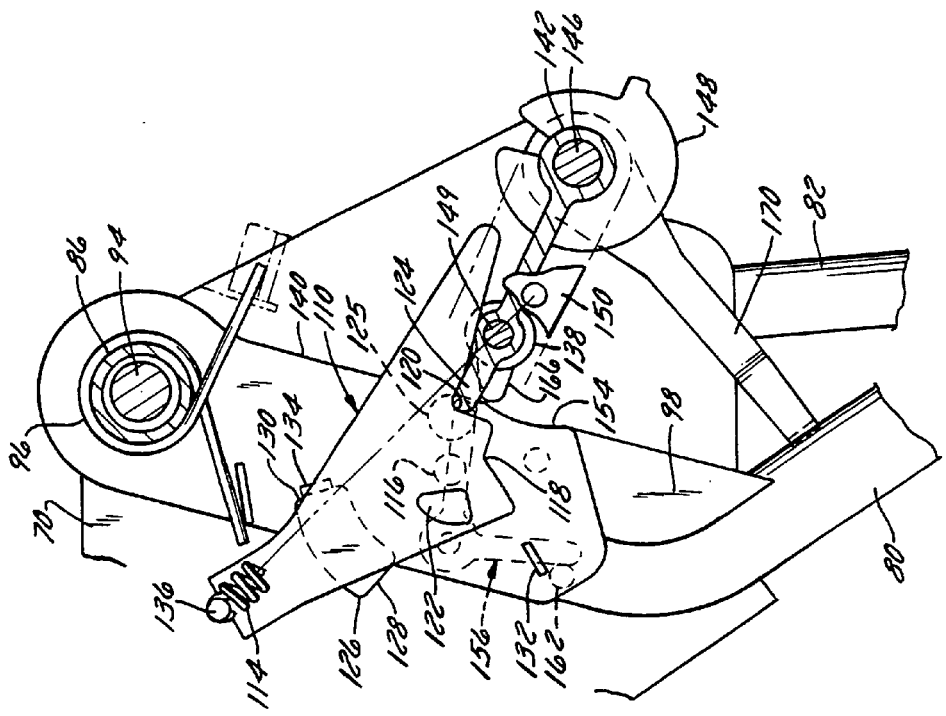

The control arm 110 comprises a metal plate pivotally mounted on the block 98 of the brake pedal 80 via a pivot pin 116, best seen in phantom in FIGS. 7–9. Control arm 110 has inner and outer faces and front and rear ends. The rear end presents detents 118 and 120, and a lug 122 is mounted on the outer face near the rear end near the axis of the pivot pin 116. During a brake lock and release cycle as detailed in Section 3*b* below, detents 118 and 120 cooperate with a dog or pawl 124 on the swing arm 112. A cushioned stop 126 is mounted on the inner face of the control arm 110 in front of the pivot pin 116. The stop 126 has first and second arcuate surfaces 128 and 130 that selectively engage corresponding first and second cushioned posts 132 and 134 on the block 90 during the brake pedal lock and release cycle as detailed below. Finally, a post 136 extends outwardly from a front end portion of the outer face of the control arm 110 for connection to a front end of the over-center spring 114.

The swing arm 112 supports the dog 124 and the cam 125. It also supports a cam follower 138 that rides along a cam 140 on the block 98. The entire swing arm 112 is mounted on a pivot tube 142 that extends laterally across the support bracket 66 and that is rotatably supported on a support pin 146. Support pin 146 is, in turn, mounted in apertures in the opposed sidewalls 68 and 70 of the support bracket 66. A pair of cam follower support arms 144 extend forwardly from the pivot tube 142 in a spaced-apart relationship. The cam follower 138 is rotatably mounted on the front ends of the support arms 144, and a cushioned elastomeric bumper 148 is mounted on the rear ends of the support arms 144. The cam follower 138 comprises a roller mounted on the support arms 144 by a roll pin 149. The bumper 148 serves as a stop for the brake pedal 80 when the brake pedal is in its at rest or fully released position seen in FIG. 7. The dog 124 is positioned laterally outwardly of the outboard cam follower support arm 144 and is configured to cooperate with the detents 118 and 120 on the control arm 110 as best seen in FIGS. 7–11 and as detailed below. The cam 125 is formed from a common stepped lug with the dog 124 and is positioned so as to be engaged by the lug 122 on the control arm 110 during a latching operation. A spring support bracket 150, disposed outboard of the dog 124, supports a post 152 to which the over-center spring 114 is connected. The locations of the posts 152 and 136 on the swing arm 112 and the control arm 110 are selected relative to 1) one another, 2) the rotational axis of the cam follower, 3) the pivot axis of the brake pedal 80, and 4) the pivot axis of the swing arm 112 to cause the spring 114 to move across the pivot axis of the swing arm 112 at selected phases of the brake pedal depression and return processes so as to selectively assist brake pedal locking and unlocking. In the illustrated embodiment, the over-center spring is 30°–40° below the horizontal when it is in its first over-center position of FIGS. 7 and 8 and a corresponding amount above the horizontal when it is in the second over-center position illustrated in FIG. 9.

The block 98 is mounted directly on the upper surface of the brake pedal lever arm 88 and serves as a support structure for several other components of the locking mechanism 84. It has the cam 140 formed directly on the upper or rear surface thereof. The cam 140 is straight along the majority of its length but has an arcuate portion 154 at its lower end surface formed from a cutout in the block 98. Arcuate portion is dimensioned such that the cam follower 138 will rest in the arcuate portion 154 in a locked position of the brake pedal 80, seen in FIG. 9.

Figure 14:
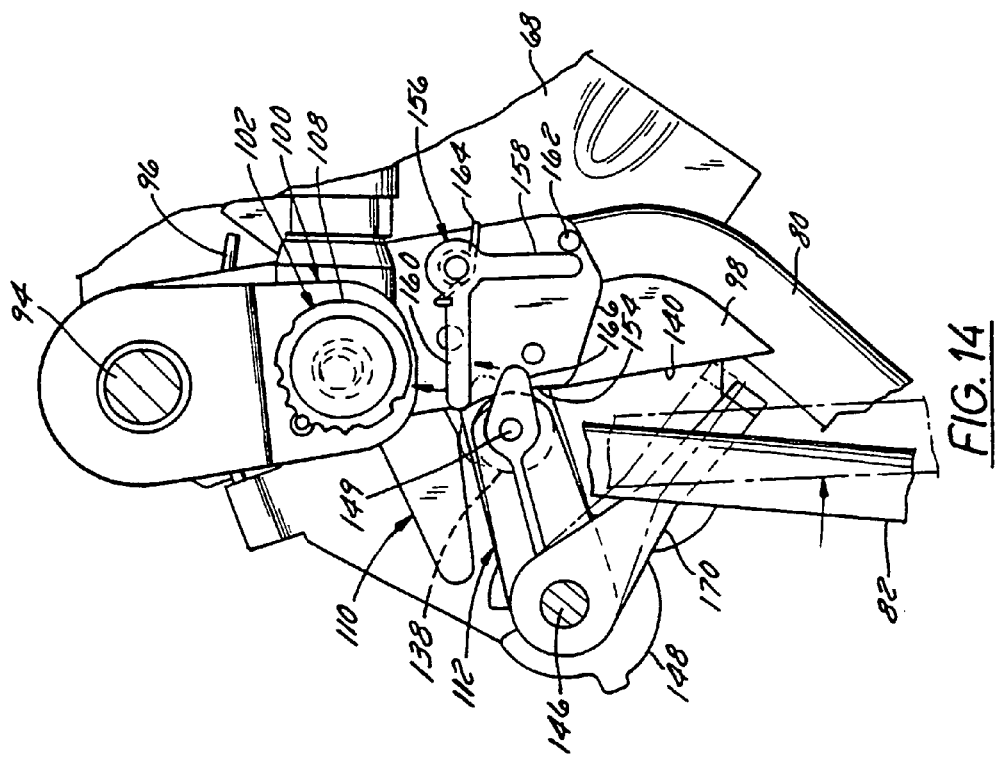
FIGS. 12–14 are inboard side-elevation views of a portion of the subassembly of FIGS. 7–11, illustrating the subassembly in different operational states.
Figure 12:
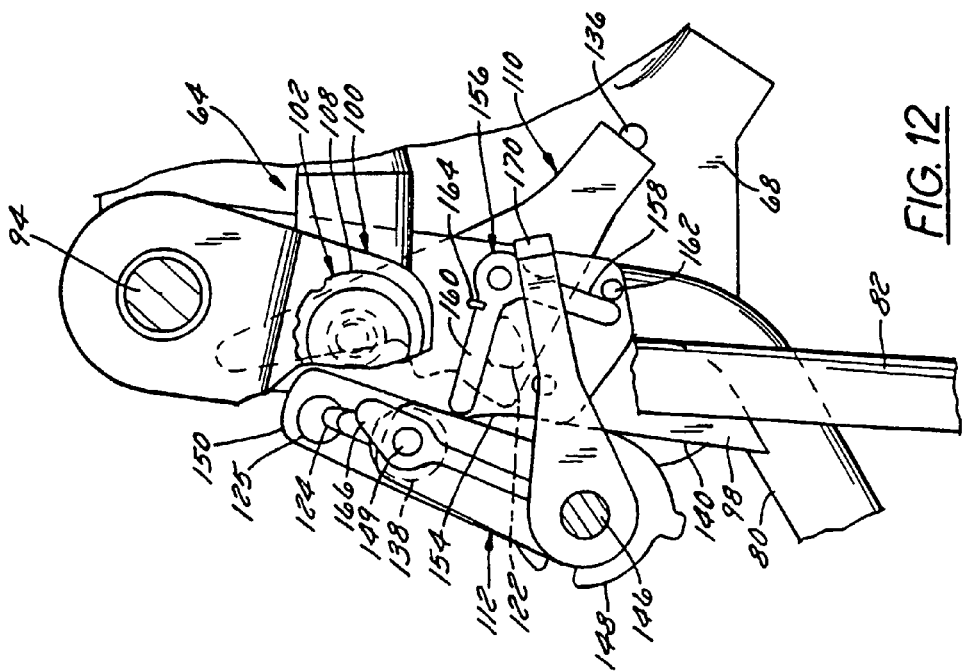
Figure 13:
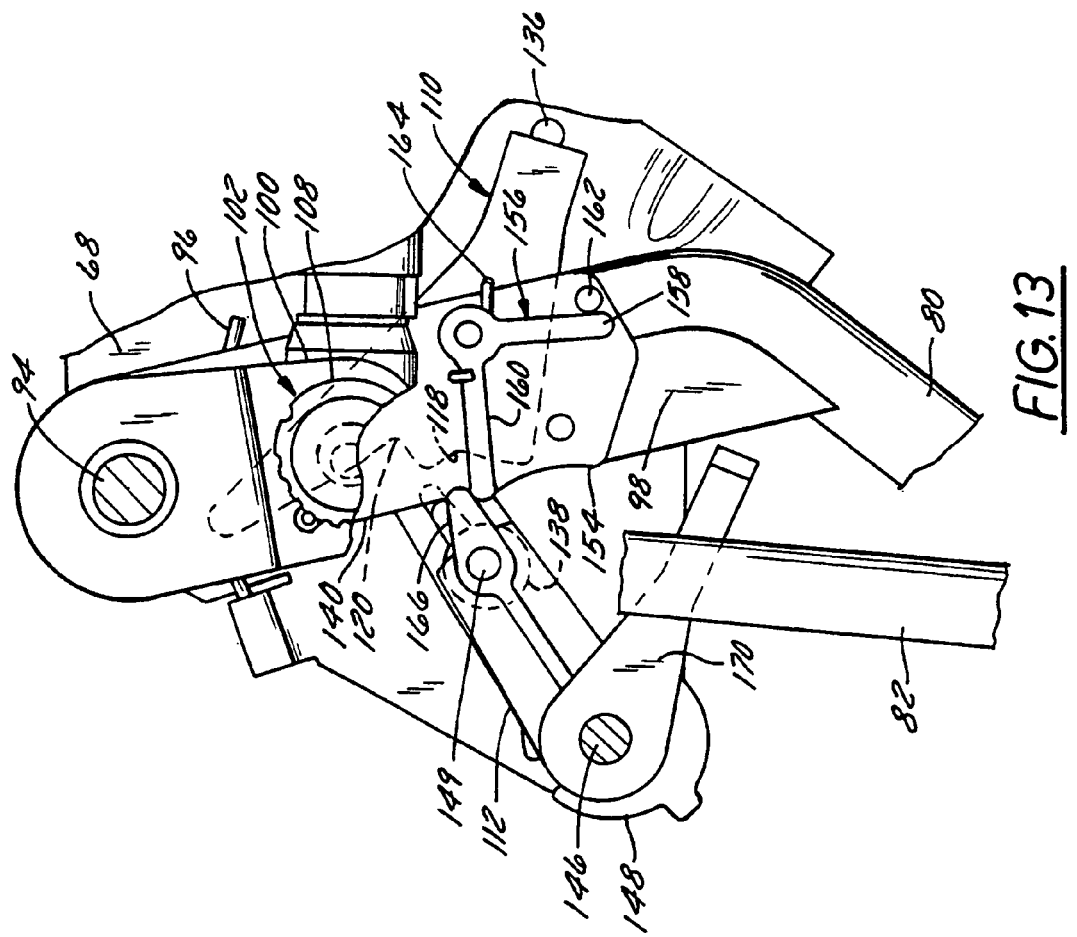

A generally L-shaped toggle arm 156 is pivotally mounted on the inner lateral surface of the block 98 adjacent the swing arm 112 as best seen in FIGS. 12–14. The toggle arm 156 includes 1) a first leg 158 and 2) a second leg 160 that extends generally orthogonally from the first leg 158. The first leg 158 is biased into contact with a post 162 on the block 98 by a return spring 164. The second leg 160 cooperates selectively with a lug 166 on the swing arm 112 so as to prevent swing arm pivoting motion during the initial phase of brake pedal depression and to subsequently permit the swing arm 112 to fall into its locking position when the lug 166 clears the second leg 160, thus allowing only one contact sound to be heard.

Finally, a kickoff arm 170 is mounted on the inboard end of the pivot tube 142 at a location beyond the inboard cam follower support arm 144. The kickoff arm 170 extends forwardly and outwardly from the pivot tube 142 so as to extend beyond the inboard sidewall 70 of the support bracket 66 and so as to be engaged by the accelerator pedal 82 upon initial accelerator pedal depression.

The accelerator pedal 82 is mounted on the inner distal end of the pivot shaft 94 at a location outside of the inboard sidewall 70 of the support bracket 66. It includes 1) a lever arm 172 that extends downwardly from the pivot shaft 94 and 2) a pad 174 that is mounted on the distal end of the lever arm 172. A portion of the lever arm 172 is positioned closely adjacent the kickoff arm 170 so as to engage the kickoff arm 170 upon initial accelerator pedal depression. In addition, a non-contact accelerator pedal position sensor 178 is positioned inside the lever arm 172 in order to provide an indication of accelerator pedal actuation. The accelerator pedal 82 is biased to its deactuated position by a return spring 180.

b. Operation of Integrated Brake Pedal and Accelerator Pedal Assembly

In operation, the integrated brake pedal and accelerator pedal assembly 54 assumes the position illustrated in FIGS. 4–7 when the brakes 52 are not engaged. At this time, the brake pedal 80 assumes an at rest or fully released position in which it is pivoted to its rearward-most extent in which the front face on the block 98 engages the bumper 148 on the swing arm 112. The cam roller 138 on the swing arm 112 is located at its maximum possible distance from the arcuate portion 154 of the cam 140. In addition, the over-center spring 114 is in its first over-center position in which it biases the control arm 110 to the position illustrated in FIGS.

5, 7, and 8 and in which its centerline is beneath the pivot axis of the swing arm 112. It therefore biases the swing arm 112 downwardly.

Next, the operator engages the brakes 52 by pressing downwardly on the pad 90 to swing the brake pedal 80 clockwise from the position shown in FIG. 7 into a service braking position shown in FIG. 13. This pivoting motion causes the master cylinder actuating pin 102 to drive the roller 103 and master cylinder main piston 104 forwardly to effect service braking. After the service braking stroke ends, but before the brake pedal 80 reaches it latch point, the lug 166 on the swing arm 112 rides along the second leg 160 of the toggle arm 156 to hold the cam roller 138 away from the cam face 140 and to hold the dog 124 and cam 125 on the swing arm 112 away from the control arm as seen in FIG. 13. As a result, service braking and subsequent brake pedal depression toward the latch point occur without contact between the latching components of the locking mechanism 84, thereby avoiding the generation of contact sounds that otherwise could give a false audible indication of pedal locking. The over-center spring 114 remains in its first over-center position at this time. The control arm 110 therefore remains in the position seen in FIGS. 7 and 8 in which it cannot latch against the swing arm 112. As a result, the brake pedal 80 will return to its released position if the operator removes his foot from the pad 90 without additional brake pedal depression.

At the end of service braking stroke and well beyond it, the lug 166 on the swing arm 112 clears the second leg 160 of the toggle arm 156 so that the swing arm 112 drops through an arc to a position in which the cam 125 engages the lug 122 on the control arm 110. This delayed dropping of the swing arm 112 has several benefits. For instance, as described above, it permits the dog 124 and cam 125 on the swing arm 112 to clear the detents 118 and 120 and the dog 122 on the control arm 110 so as to prevent a false audible indication of brake pedal locking. Moreover, it prevents the swing arm 112 from swinging towards its locked position until the over-center spring 114 is stretched sufficiently to store enough potential energy to effectively assist in swing arm movement into its locked position. In addition, the solid contact between the cam 125 and the lug 122 that occurs when the swing arm 112 drops into place produces a distinctive "clicking" sound that provides an audible indication to the operator that the brake pedal 80 has moved into a position in which it can be locked.

When the operator releases his foot from the brake pedal 80 after depressing it to its locked position, the brake pedal returns a very small amount to permit the over-center spring 114 to move from its first over-center position of FIGS. 7 and 8 to the second over-center position illustrated in FIG. 9 as a result of the swing arm cam 125 pushing the control arm dog 122. As a result of this movement, the control arm 110 pivots rapidly from the position illustrated in FIGS. 7 and 8 to the latched position illustrated in FIG. 9. Because the dog 122 is located very close to the pivot axis of the control arm 110, a very small range of axial brake pedal movement (on the order of a few thousands of an inch) results in 60° or more of control arm pivoting movement. This relationship reduces the work required of the over-center spring 114 during the latching process. The second face 130 on the stop 126 now engages the second post 134 on the block 98, and the first or lower detent 118 on the control arm 110 now engages the dog 124 on the swing arm 112 to lock the swing arm 112 in position. This motion provides a distinctive clicking sound that provides an audible indication to the operator that the brake pedal 80 has been locked. The brake pedal 80 will thereafter remain in the locked position of FIG. 9 under the latching force of the control arm 110 when the operator releases the brake pedal 80. However, because the spring 114 is now in is second over-center position in which its centerline is above the pivot axis of the control arm 112, it biases the control arm 112 upwardly rather than downwardly, thereby priming the control arm 112 for subsequent release.

The holding force applied on the control arm 110 by the over-center spring 114 at this time should be large enough so as not to be overcome by any force that might inadvertently be placed upon or generated through the accelerator pedal 82 by virtue of the vehicle 30 being jostled during shipment or by rough treatment by errant operators. However, this holding force need not be very large because any moment arm which might tend to cause the swing arm 112 to swing out of its locked position is very small. As a result, a relatively weak spring (having a spring load on the order of 8–12 lb can be used as the over-center spring 114.

Figure 10:
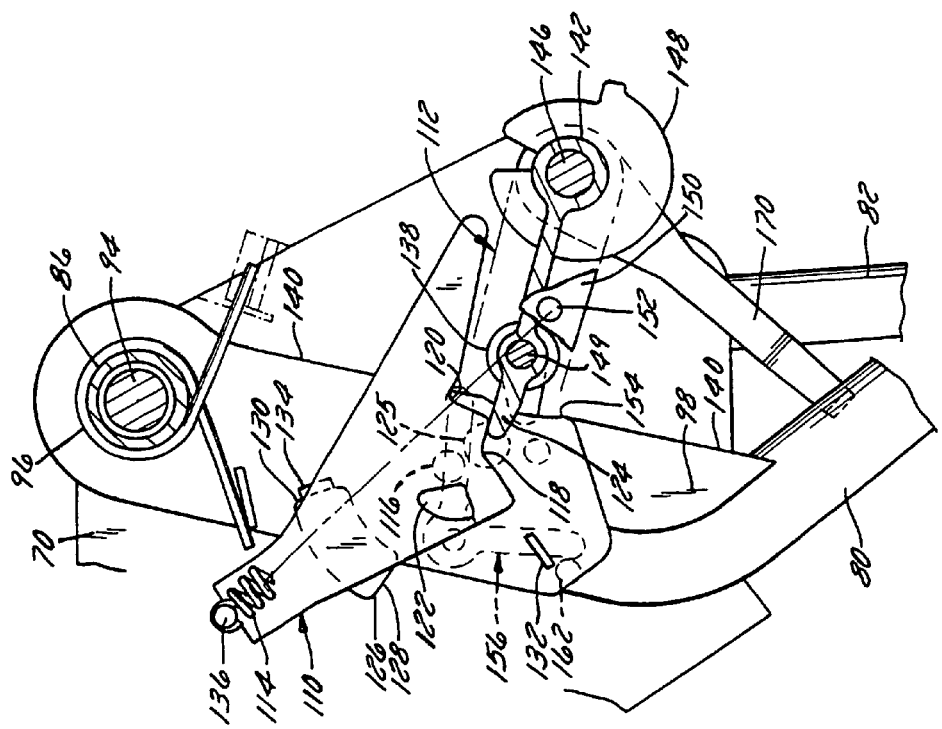

The brakes 52 may be released by operating either the brake pedal 80 or the accelerator pedal 82 to unlatch the brake pedal 80 from its locked position. To release the brakes using the brake pedal 80, all the operator need do is depress the pedal 80 beyond its locked position to an overtravel position. This brake pedal movement and consequent swing arm movement will cause the dog 124 on the swing arm 112 to slip out of the first detent 118 on the control arm 110, permitting the over-center spring 114 to pull the swing arm 112 upwardly so that dog 124 snaps against the second detent 120 as seen in FIG. 10. The snapping action of the dog 124 against the detent 120 produces a distinctive click that apprises the operator that the brake pedal 80 is unlatched. As a result, the brake pedal 80 will return to its at-rest position under the biasing forces of the return spring 96 and the accumulator spring 246 when the operator releases the brake pedal 80.

The brake pedal 80 places a substantial moment on the swing arm 112 during the return stroke of the brake pedal 80. The dog 124 on the swing arm 112 produces a corresponding moment on the upper surface of the detent 120 of sufficient magnitude to pivot the control arm 110 counter-clockwise from the position of FIG. 11 until the control arm 110 again assumes the position seen of FIG. 7. The over-center spring 114 therefore moves back to its first over-center position so that it again biases the swing arm 112 downwardly. In addition, the lug 166 on the inner lateral surface of the swing arm 112 engages the second leg 160 of the toggle arm 156 during the return stroke to cause the toggle arm 156 to pivot clockwise to permit unobstructed movement of the lug 166 past the toggle arm 156 as illustrated in FIG. 14. The toggle arm 156 then drops back into its initial position under the biasing force of the spring 164 so that it is primed for the next service braking cycle.

Brake pedal release using the accelerator pedal 82 occurs in similar sequence. The operator presses downwardly on the accelerator pedal 82 so that the lever arm 172 engages the kickoff arm 170. This engagement forces the swing arm 112 to swing clockwise about the pivot tube 142 to drive the control arm 110 to pivot from the position illustrated in FIG. 9, through the position illustrated in FIG. 11, and to the position illustrated in FIG. 7 as described above. As before, this movement unlatches the swing arm 112 from the control arm 110 and permits the brake pedal 80 to return to its at-rest position under the biasing force of the brake pedal return spring 96 and the accumulator spring 246. Also as before, this movement forces the control arm 110 and over-center spring 114 back to the initial position of FIG. 7. Because the cutout 154 in the cam surface 140 is tangential to the swing arm pivot arc, the cam roller 138 simply moves circumferentially along the cam surface 140 during the initial, accelerator pedal imposed phase of the unlatching operation without resistance from the rather substantial return force imposed on the brake pedal 80 by the brake pedal return spring 96 and the accumulator spring 246. Brake pedal unlatching therefore imparts little resistance to accelerator pedal motion, and brakes 52 are disengaged after the first 1–3 inches of accelerator pedal stroke with minimal operator effort. In fact, due to the configuration of the locking mechanism 84, the brake pedal 80 and locking mechanism 84 impart less than 1.0 lbs, and preferably less than 0.5 lbs, of resistance to accelerator pedal motion. As a result, the operator can "feather" accelerator pedal motion so that the brakes 52 can be disengaged without over-depressing the accelerator pedal 82. This eliminates jerky motion or quick starts often associated with golf cars and other light-duty vehicles whose unlocking mechanism typically impart 5 lbs or more of resistive force to accelerator pedal movement when the brake pedal is unlatched by actuating the accelerator pedal.

4. Master Cylinder/Accumulator Assembly a. Construction of Master Cylinder/Accumulator Assembly The master cylinder 60 and hydraulic accumulator 62 are configured to translate the mechanical actuating forces generated by brake pedal depression into hydraulic pressure that first engages the brakes 52 and that then stores additional energy for holding the brakes 52 in their engaged condition. This energy storage provides several benefits. For instance, it permits the brake system 50 to make up for "creep" or fluid pressure loss that may occur due, e.g., relaxation of elastomeric components of the system. Moreover, it can assist in returning the brake pedal 80 to its at rest position following release of a locked brake pedal.

Referring to FIGS. 2–5, 15, and 16, the master cylinder 60 is generally conventional. It includes a housing 200 having an internal horizontal bore 202 formed therein. A reservoir 204 is formed above the bore 202 for storing hydraulic fluid. The bore 202 has an upper fill inlet 206 and a rear outlet 208. The inlet 206 cooperates with the reservoir 204. The rear outlet 208 opens into an accumulator chamber 210, detailed below. The master cylinder main piston 104 is slidably mounted in the bore 202 so as to extend rearwardly from the rear end of the bore 202 and into contact with the roller 103. As a result of this arrangement, 1) depression of the brake 80 and consequent swinging movement of the actuator pin 102 and roller 103 drives the main piston 104 forwardly through the bore 206 to pressurize the outlet 208, and 2) release of the brake pedal 80 permits the main piston 104 to move rearwardly through the bore 202 to depressurize the outlet 208.

Referring to FIGS. 15–18, accumulator chamber 210, as well as the remainder of the accumulator 62, may be located at any pressurized point in the braking system 50. In the illustrated embodiment, however, the chamber 210 is formed in an extension 212 of the master cylinder housing 200 extending essentially collinearly with the bore 202 so as to reduce the number of parts in the accumulator 62 and to facilitate assembly. In fact, this and other aspects of the relationship between the accumulator 62 and master cylinder 60 permit the master cylinder 60 and accumulator to be mounted on the mounting bracket 66 or another suitable support structure as a single integrated assembly. The accumulator chamber 210 has a first orifice 218 in a rear wall thereof that opens directly into the master cylinder outlet 208, and a second orifice 220 in an upper wall thereof that communicates with a bleeder port 222 and a brake supply orifice 224 in the master cylinder housing extension 212. The orifice 224 is connected to the front and/or rear vehicle brakes 52 via associated brake lines 56 (only one of which is illustrated in FIG. 1).

Figure 17:
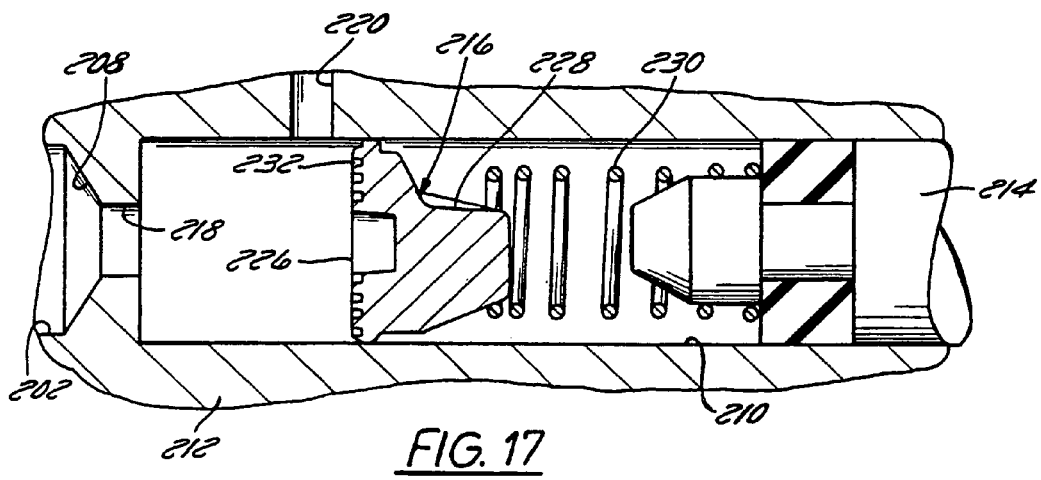
FIG. 17 is sectional fragmentary view of a portion of the assembly of FIG. 15, illustrating a one-way restrictor valve of the assembly in an open or free flow position thereof.
Figure 18:
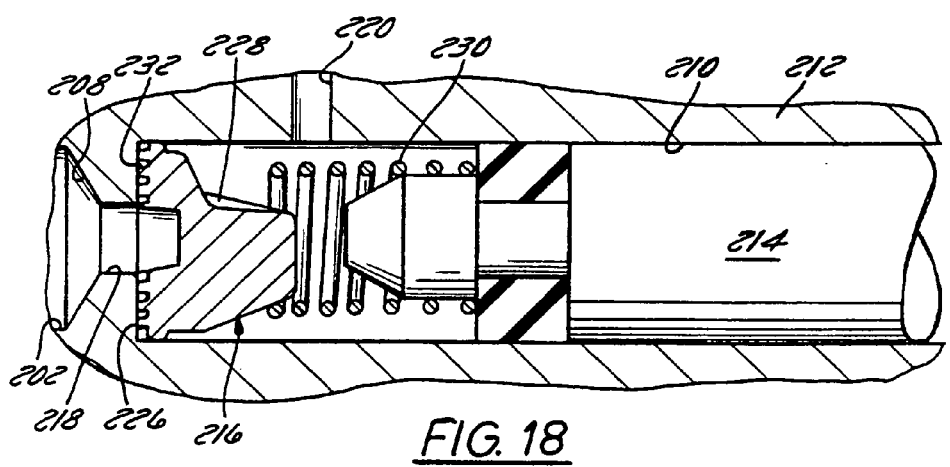
FIG. 18 corresponds to FIG. 17 and illustrates the one-way restrictor valve in a closed or restricting position thereof.
Figure 19:
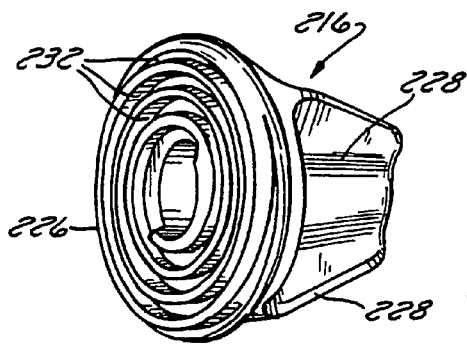
FIGS. 19 and 20 are rear and front perspective views, respectively, of the restrictor valve of FIGS. 17 and 18.
Figure 20:
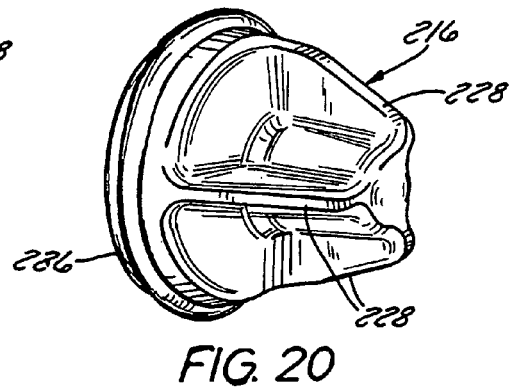
Figure 21:
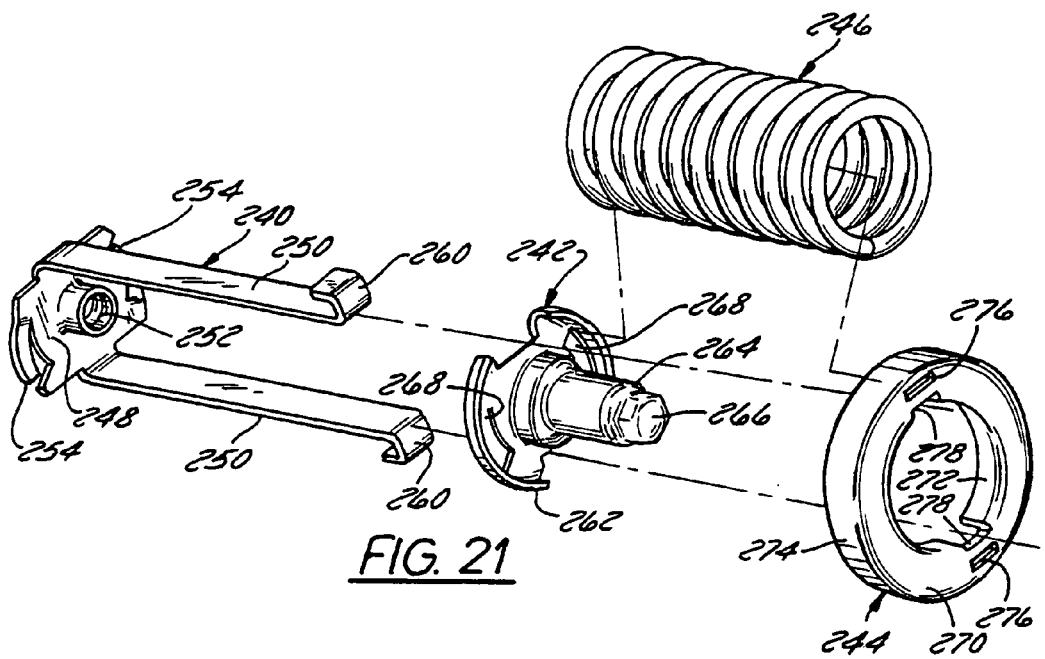
FIG. 21 is an exploded perspective view of the accumulator.

Referring to FIGS. 17 and 18, an accumulator drive piston 214 and a one-way restrictor valve 216 are mounted in the accumulator chamber 210. The accumulator drive piston 214 is slidably mounted in the chamber 210 so as to extend beyond a rear end of the master cylinder extension 212 and into contact with the accumulator spring assembly 62. The one-way restrictor valve is positioned forwardly of the accumulator drive piston 214 and is biased toward the front of the chamber 210 by a return spring 230 that is seated on the one-way restrictor valve 216 at its front end and on the accumulator drive piston 214 at its rear end.

The purpose of the one-way restrictor valve 216 is to damp return fluid flow into the master cylinder 60 from the accumulator chamber 210 upon release of the brakes 52, thereby inhibiting the pronounced brake pedal snapback effect exhibited by most park and hold brake systems of this type. The energy stored in the accumulator 62 and the brakes 52 instead is released more gradually, permitting a much smoother brake pedal return. Referring to FIGS. 17–20, the one-way restrictor valve 216 has an annular rear axial face 226 and a plurality of guide ribs 228. The guide ribs extend forwardly from the rear face 226 to a front end of the valve 216 to support and guide the front end of the return spring permitting free fluid flow to the rear face 226 of the one-way restrictor valve 216. The rear face 226 has a groove 232 formed therein that creates a convoluted elongated flow path from the accumulator chamber 210 to the master cylinder outlet 208 when the face 226 is seated against the rear end of the accumulator chamber 210 as seen in FIG. 18. Fluid flow effects, head losses and other flow reduction effects provided by this fluid flow through elongated flow path provide the same flow restriction as a conventional restricting orifice. However, the orifice produced by this convoluted flow path produces several benefits not achieved by a conventional restricting orifice. First, it is less susceptible to plugging than a conventional restricting orifice due to its much larger physical size and is self-cleaning, particularly when the valve 216 moves to its open position to fully expose the rear face 26 of the valve to allow fluid flow therepast. It is also less susceptible than a conventional restricting orifice to variations in hydraulic fluid flow rates that are likely to occur over the expected range of hydraulic fluid operating temperatures.

Virtually any effective orifice diameter can be achieved by appropriately selecting the length, shape, and cross-sectional area of the groove 232. In order to provide the desired damping effect, the illustrated flow path has an equivalent orifice diameter of less than 0.0025" and preferably of approximately 0.0015". It has a square cross-section that is approximately 0.025" on a side and a length of several inches. Its shape is preferably spiral, but other convoluted shapes could be employed.

The hydraulic accumulator 62 performs several beneficial functions. For instance, it reduces the effort required by the operator to depress the brake pedal 80 to its locked position. It also stores energy generated upon manual pressurization of the hydraulic fluid in a form that can then be used to maintain the brakes 32 in their engaged positions after the brake pedal 80 is locked. Finally, it assists in returning the brake pedal 80 to its released position upon brake pedal unlocking. The preferred accumulator structure is one that has a minimum number of components and that can be readily assembled as a unit offsite and then attached to the remainder of the brake assembly 50 by an unskilled operator. Towards these ends, the hydraulic accumulator 62 is a spring type accumulator taking the form best seen in FIGS. 15, 16, and 21–23. It includes a retainer 240, a movable compression plate 242 disposed at the rear end of the retainer 240, a cap 244 affixed to the front end of the retainer 240, and a compression spring 246 captured between the compression plate 242 and the cap 244.

Figure 24:
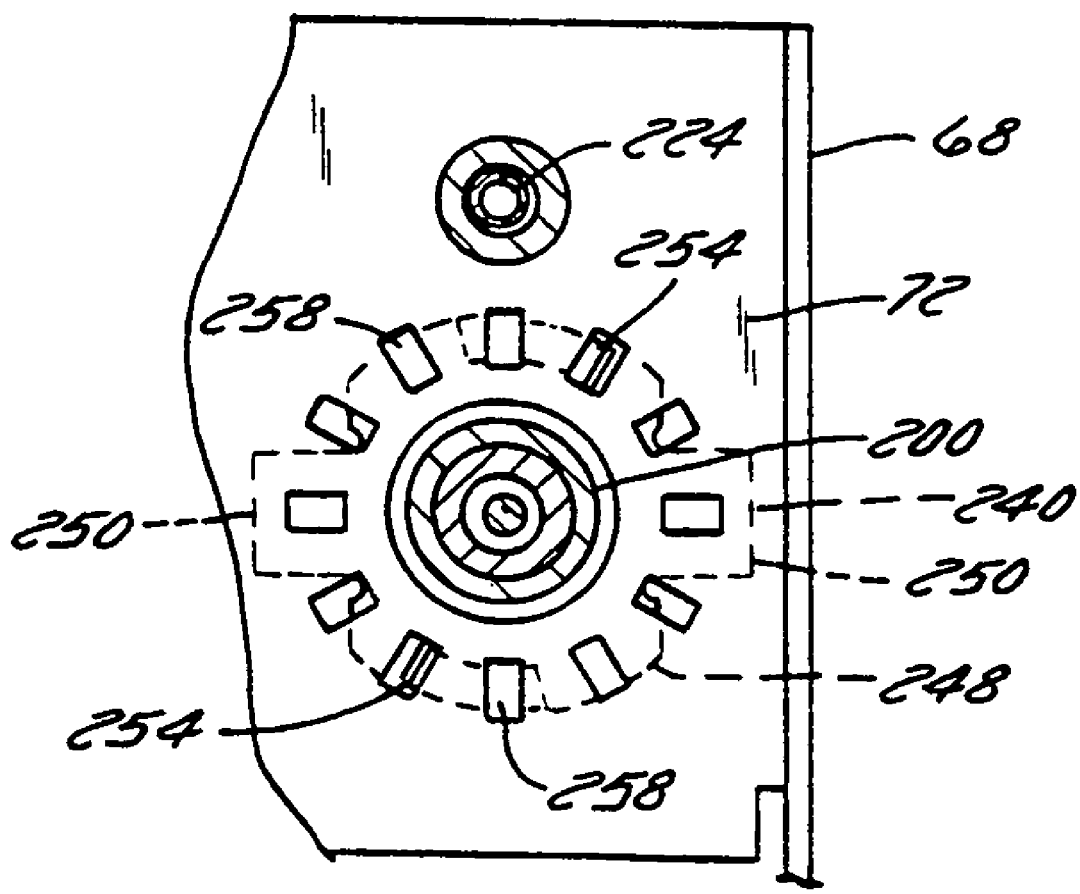
FIG. 24 is sectional end view taken generally along the lines 24—24 in FIG. 16.

The retainer 240 includes a front mounting plate 248 and a plurality (preferably two) straps 250 that extend rearwardly from the mounting plate 248. The mounting plate 248 has an internally threaded post 252 and a pair of tangs 254 located radially outside of the post 254 and bent in opposite directions. As best seen in FIGS. 15 and 16, the threaded center post 252 screws onto external threads 256 on the master cylinder housing extension 212, and the tangs 254 lock into slots 258 in the front wall 72 of the support bracket 66 when the post 252 is fully tightened onto the master cylinder housing extension 212 as best seen in FIG. 24. The accumulator 62 can subsequently be unscrewed from the master cylinder housing extension 212 only by overtorquing the accumulator 62 in a counter-clockwise direction to release the tangs 254 from the slots 258. The straps 250 serve as mounts for the cap 244 and are configured to guide and support both the spring 246 and the compression plate 242. Each strap 250 extends rearwardly from the mounting plate 248 and terminates in a hook 260 at its distal end. The bodies of the straps 250 serve as supports and guides for the compression plate 242 and the spring 246. The hooks 260 latch onto the cap 244 as detailed below to fix the cap in place.

The compression plate 242 includes a rear annular spring support portion 262 and a cup portion 264. The cup portion 264 extends axially forwardly from the center of the rear spring support portion 262 to a front nut portion 266. Spring support portion 262 presents a seat for the rear end of the accumulator spring 246. Cup portion 264 is configured to surround the end of the master cylinder housing extension 212 and to abut the front end of the accumulator drive piston 214 as best seen in FIGS. 15 and 16. Apertures 268 are formed in the spring support portion 262 for passage of the straps 250. Upon assembly, this relationship between the straps 250 of the retainer 240 and the apertures 268 in the compression plate 242 permits the compression plate 242 to move axially relative to the retainer 240 but prevents relative rotational movement between the compression plate 242 and the retainer 240.

Figure 22:
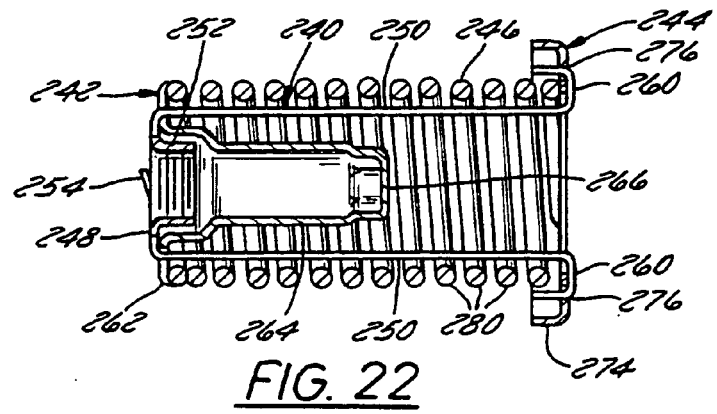
FIG. 22 is a sectional side elevation view of the accumulator.
Figure 23:
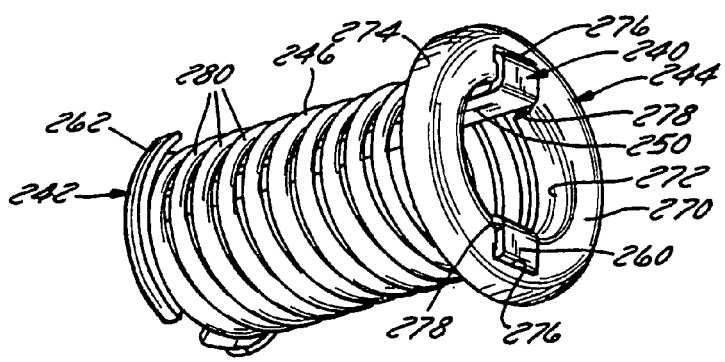
FIG. 23 is a perspective view of the accumulator.

The cap 244 comprises a metal annular ring having a circular axially front end portion 270 and inner and outer circular flanges 272 and 274. The flanges 272 and 274 extend rearwardly from the front end portion 270 so as to form a groove serving as a second seat for the spring 246. A pair of hook receiving apertures 276 are formed in the front end portion 270 adjacent to corresponding notches 278. As best seen in FIGS. 22 and 23, the notches 278 are configured to receive the straps 250 and the hooks 260 of the retainer 240, thereby locking the cap 244 onto the retainer 240.

b. Assembly and Operation of the Accumulator

The accumulator 62 is assembled as a unit at a location remote from the remainder of the system 50. The entire assembly 240, 242, etc. can be assembled as a unit and then screwed onto the master cylinder housing extension 212 using the nut portion 266 on the cup portion 264. First, the apertures 268 in the compression plate 242 are slid over the straps 250 of the retainer 240, and the compression plate 242 is pushed downwardly onto the mounting plate 248 of the retainer 240. Then, the spring 246 is positioned over the straps 250 so that its rear end rests on the spring seat formed by the annular portion of the compression plate 242. In this initial, uncompressed state of the spring 246, the spring actually extends beyond the front end of the retainer 240. Next, the assembler forces cap 244 downwardly against the spring 246 to compress the spring 246 while simultaneously pinching the straps 250 of the retainer 240 radially inwardly to align the straps 250 with the notches 278 in the inner periphery of the cap 244. The assembler then forces the cap 244 through the notches 278 in the cap 244 and positions the cap 244 so that the hooks 260 on the straps 250 are aligned with the apertures 276 in the front end wall portion 270 of the cap 244. The assembler then releases the spring 246 so that it forces the apertures 276 in the cap 244 through the hooks 260 as seen in FIG. 22.

The spring 246 is precompressed a substantial amount as a result of the preassembly process. As discussed in more detail below, this spring precompression sets a threshold pressure below which substantially all work performed by the master cylinder 60 is applied toward fluid pressurization and above which the majority of the work performed by the master cylinder 60 is applied toward energy storage in the accumulator 62. The amount of precompression required for a particular pressurization threshold level will vary depending on the spring rate of the spring 246 and its caged height. The spring 246 of the illustrated embodiment has a free length of about 9" and a spring rate of 25 lbs/in. It is precompressed to an installed length of approximately 4" during the assembly process to provide a threshold pressure of about 800–850 psi.

Next, the preassembled accumulator 62 is mounted on the master cylinder housing extension 212 by turning the nut 266 to thread the post 252 onto the threads 256 on the master cylinder housing extension 212 until the tangs 254 on the mounting plate 248 lock into opposed slots 258 in the front wall 72 of the support bracket 66 as seen in FIG. 24. The accumulator 62 is now positioned so that accumulator drive piston translation, occurring upon master cylinder actuation and consequent pressurization of the accumulator chamber 210, will force the compression plate 242 forwardly to compress the spring 246 as seen in FIG. 15.

Figure 25:
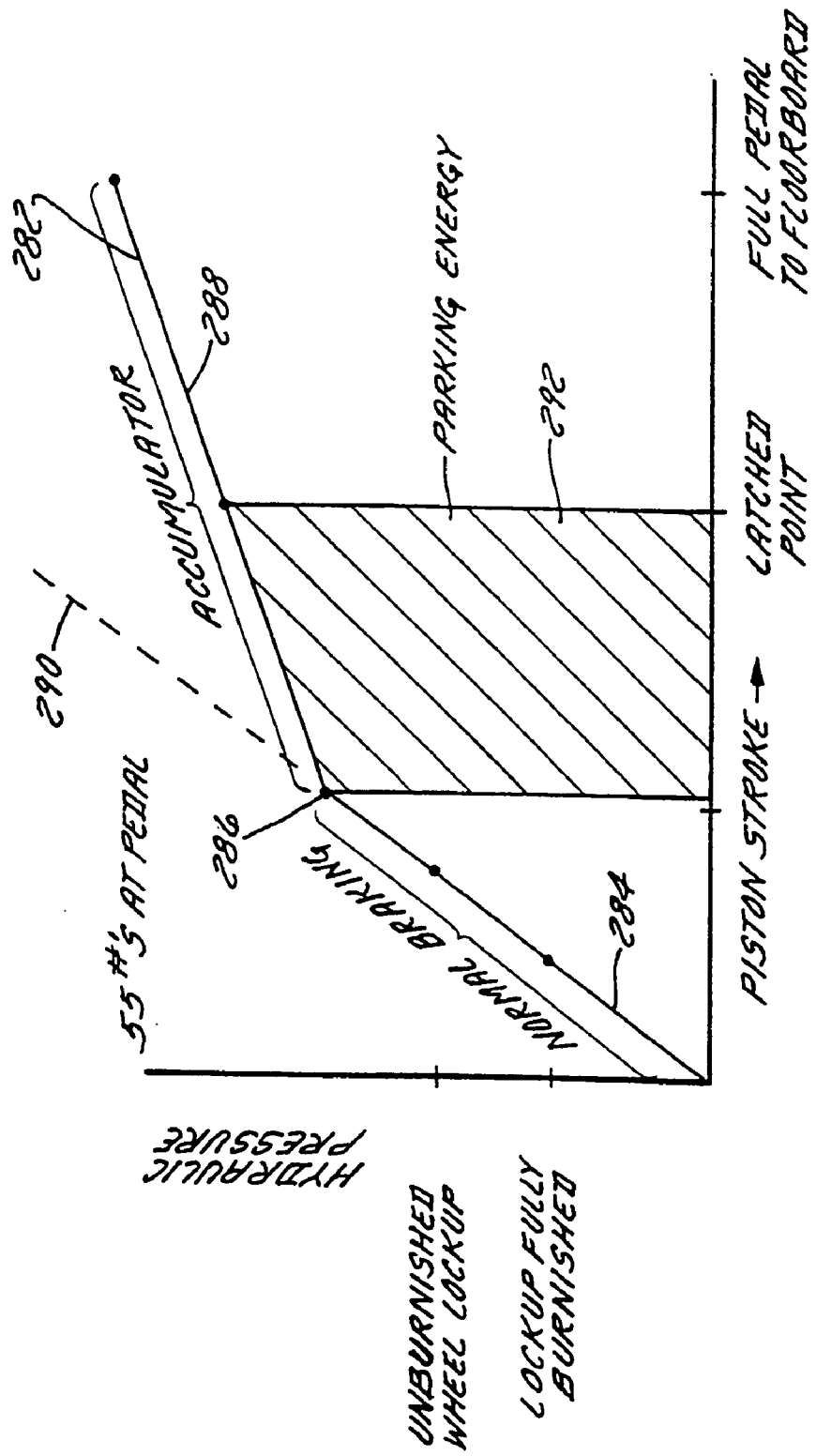
FIG. 25 is a graph illustrating the effect of the accumulator on a braking operation.

In use, the accumulator 62 assumes the position illustrated in FIG. 16 when the brakes 52 are released. At this time, the one-way restrictor valve 216 is seated on the face of the chamber 210 under the biasing force of the spring 230 as seen in FIG. 18, and the compression plate 242 is seated on the face of the mounting plate 248 as seen in FIG. 16. When the operator depresses the brake pedal 80 to actuate the master cylinder 60, the system hydraulic pressure increases generally linearly as represented by the portion 284 of the curve 282 in FIG. 25, thereby opening the one-way restrictor valve 216 and engaging the brakes 52. The pressure generated by brake pedal actuation will increase rapidly and generally linearly with pedal stroke until system pressure increases to the threshold pressure set by the precompression of the spring 246. This threshold pressure, which forms the transition point between pressure intensification and energy storage phases of brake pedal stroke, is illustrated at point 286 in FIG. 25.

The precompression of the accumulator spring 246 is selected to set the threshold pressure to a level well above the lockup point of the brakes 52 but well below the single latch point of the brake pedal 80 detailed in Section 3 above.

In a system in which the brake pedal is latched in position 8" into its stroke, service braking is performed in the first 2 to 3" of brake pedal stroke even under panic stop conditions. In fact, brake lockup typically occurs after no more than 2½" of brake pedal stroke. Typical lockup points for fully burnished and unburnished brakes are denoted as such in FIG. 25.

Additional brake pedal depression past the threshold point 286 compresses the accumulator spring 246, thereby storing the energy of master cylinder actuation in the form of potential energy in the spring 246. System pressure rises at a much slower rate during this phase of pedal actuation, as represented by the shallow portion 288 of the curve 282. This effect results from the fact that the incremental increase in input force required to compress the spring 246 is substantially lower than the incremental increase in input force required to additionally pressurize the hydraulic fluid. As a result, resistance to brake pedal movement during this second phase of brake pedal actuation increases at a much slower rate than during the first phase.

In the illustrated embodiment, the transition point 286 between the first and second phases of brake pedal actuation occurs at approximately 800–850 psi of hydraulic pressure. Pressure thereafter rises gradually to about 900–950 psi when the brake pedal 80 is latched in its locked position and the end of the second phase of its actuation stroke. The compression spring 246 is compressed about ½" at this time. At least 50%, and possibly at least 65% or more, of the total pedal stroke required to latch the brake pedal 80 in its locked position is consumed in the second phase of brake pedal actuation. As a result, by the end of this phase, more than ample energy is stored in the accumulator 62 to hold the brakes 52 and to return the brake pedal 80 with little additional effort by the operator. (The amount of energy stored by the accumulator 62 is represented by the hatched area 292 under the curve 282 in FIG. 25.)

Considerable work is performed over the rather lengthy second phase of the brake pedal actuation stroke, but at much lower input forces than would be required to perform the same amount of work (and hence to store the same amount of energy) over a shorter stroke. In fact, the transition point 286 is reached at an operator input force of about 35 lbs, and only an additional 25 lbs of input force is required to depress the brake pedal 80 to its latch point. This is in contrast to the drastically higher input force that would be required to pressurize the fluid to a much higher level if the operator were to press the brake pedal 80 to its latch point without an accumulator in the system (see the phantom line 290 in FIG. 25). Hence, the accumulator 62 greatly facilitates brake pedal latching and reduces the precision required to achieve the latch point because the operator strokes the pedal a great distance easily.

Upon brake pedal release, the one-way restrictor valve 216 immediately seats against the front end of the chamber 210 under the force of the return spring 230, thereby preventing rapid depressurization of the accumulator chamber 210. The damping effect provided by this restricted fluid flow imposes a relatively low return speed on the brake pedal 80 that continues for a period of time. The brake pedal 80 consequently returns to its initial position without any undesirable rapid snapback that otherwise would produce substantial wear and tear on the system and even risk injury to the operator. The damping grease between the brake pedal pivot shaft 86 and the stationary sleeve 92 additionally damps brake pedal return movement at this time. However, the combined damping effect provided by the one-way restrictor valve 216 and the damping grease does not overly-damp brake pedal return. Instead, the brake pedal 80 is biased by the springs 96 and 246 to quickly follow the operator's foot without pushing the foot upwardly too fast. The remaining, small snapback impact forces resulting from this moderate return speed are absorbed by the elastomeric bumper 148 on the swing arm 112 when the brake pedal 80 reaches its at-rest or fully released position, resulting in a virtually noiseless and vibrationless pedal return.

Many changes and modifications could be made to the invention without departing from the spirit thereof. Some of these changes are discussed above. Other changes will become apparent from the appended claims.

What is claimed is:

1. A brake actuator assembly for a park and hold brake system of a vehicle comprising:
    (A) a brake pedal which is pivotal, under the imposition of manual operating forces, from an at-rest position, 1) through an operating stroke in which the vehicle's brakes are engaged and in which said brake pedal returns automatically to said at-rest position upon release of the manual operating forces to release the brakes, 2) through a locked position which is located beyond an end of said operating stroke, and 3) to an over-travel position which is located beyond said locked position;
    (B) a brake pedal locking mechanism which cooperates with said brake pedal so as to 1) automatically latch said brake pedal in said locked position upon movement of said brake pedal into said locked position, thereby holding the brakes in their engaged condition upon release of the actuating forces, and 2) automatically unlatch said brake pedal from said locked position upon movement of said brake pedal into said over-travel position, thereby permitting return of said brake pedal to said at-rest position upon release of the actuating forces and releasing the brakes;
    (C) an accelerator pedal;
    (D) a kickoff mechanism which couples said accelerator pedal to said brake pedal locking mechanism and which actuates said brake pedal locking mechanism to unlatch said brake pedal from said locked position upon actuation of said accelerator pedal; and
    (E) a toggle arm which cooperates with said locking mechanism so as to prevent relative contact between first and second components of said locking mechanism until said brake pedal approaches said locked position, thereby providing for said single point latching and said single audible indication.

2. A brake actuator assembly for a hydraulic braking system of a vehicle comprising:
    (A) a brake pedal which is pivotal, under the imposition of manual operating forces, from an at-rest position, through an operating stroke in which the vehicle's brakes are engaged and in which said brake pedal returns automatically to said at-rest position upon release of the manual operating forces to release the brakes, and to a locked position which is located beyond an end of said operating stroke;
    (B) a brake pedal locking mechanism which automatically latches said brake pedal in said locked position upon movement of said brake pedal into said locked position, thereby holding the brakes in their engaged condition, said brake pedal locking mechanism including a cam on said brake pedal, a swing arm, and a roller which is mounted on said swing arm and which rides along said cam;

(C) an accelerator pedal; and
(D) a kickoff mechanism which is mounted on said swing arm and which is engaged by said accelerator pedal upon accelerator pedal actuation to move said swing arm into a position that unlatches said brake pedal from said locked position, wherein said cam and said roller are configured such that, during at least a portion of a brake pedal matching process, said roller rides along said cam in a path that is at least generally tangential to a pivot arc of said swing arm, thereby facilitating unlocking of said lock mechanism by said kick-off mechanism.

3. A vehicle comprising:
(A) a plurality of wheels;
(B) a chassis supported on said wheels and having a floorboard; and
(C) a hydraulic braking system comprising
   (1) a plurality of hydraulic brakes, each of which is associated with a corresponding one of said wheels,
   (2) a hydraulic master cylinder in fluid communication with said brakes, and
   (3) a brake actuator assembly which is coupled to said master cylinder, said brake actuator assembly being located entirely above said floorboard and including
      a) a support bracket which is mounted on said vehicle above said floorboard,
      b) a brake pedal which is mounted on said support bracket so as to be pivotal, under the imposition of manual operating forces, from an at-rest position,
         i) through an operating stroke in which the vehicle's brakes are engaged and in which said brake pedal returns automatically to said at-rest position upon release of the manual operating forces to release the brakes, ii) through a locked position which is located beyond an end of said operating stroke, and iii) to an over-travel position which is located beyond said locked position,
      c) a brake pedal locking mechanism including a cam on said brake pedal, a cam follower which engages said brake pedal, a control arm which operatively cooperates with said cam follower, and an over center spring which operatively communicates with both said cam follower and said control arm and which moves through an over-center position upon movement of said brake pedal into said locked position at the end of said operating stroke, thereby changing a biasing direction thereof from one pulling said cam follower downwardly to one pulling said cam follower upwardly,
      d) an accelerator pedal which is pivotally mounted on said support bracket, and
      e) a kickoff mechanism which couples said accelerator pedal to said brake pedal locking mechanism and which actuates said brake pedal locking mechanism to unlatching said brake pedal from said locked position upon actuation of said accelerator pedal.

4. A method of applying and holding a brake of a vehicle comprising:
(A) manually driving a brake pedal to pivot from an at-rest position and into an operating position; then
(B) manually driving said brake pedal through said operating position and to a locked position in which a locking mechanism latches said brake pedal in said locked position, said locked position comprising the sole position in which said brake pedal can be locked with the brakes engaged, and said locking mechanism comprising first and second latching components that do not contact one another until said brake pedal has been depressed sufficiently to be latched in said locked position, thereby providing a single audible indication that said brake pedal has been depressed sufficiently to be latched in said locked position; then
(C) releasing said brake pedal while said brake pedal remains in its locked position; then
(D) unlatching said brake pedal from said locked position by one of
   1) manually driving said brake pedal to an over-travel position which is located beyond said locked position and in which said locking mechanism automatically unlatches said brake pedal, and
   2) manually driving an accelerator pedal into engagement with a kick-off mechanism to automatically manipulate said locking mechanism to unlatch said brake pedal; and then
(E) permitting said brake pedal to return to said at-rest position.

5. A method of applying and holding a brake of a vehicle comprising:
(A) manually driving a brake pedal to pivot from an at-rest position and into an operating position; then
(B) manually driving said brake pedal through said operating position and to a locked position in which a locking mechanism latches said brake pedal in said locked position; then
(C) releasing said brake pedal while said brake pedal remains in its locked position; then
(D) unlatching said brake pedal from said locked position by manually driving an accelerator pedal into a position in which said accelerator pedal interacts with said locking mechanism to unlatch said brake pedal and to permit said brake pedal to return to said at-rest position, wherein, during said step (D), said interaction between said brake pedal and said locking mechanism imparts no more than 1.0 lbs of resistance to accelerator pedal motion; and
wherein said locking mechanism includes a cam mounted on a swing arm and a roller, and
wherein said cam and said roller are configured such that, during at least an initial portion of a brake pedal unlatching process, said roller rides along said cam in a path that is at least generally tangential to a pivot arc of said swing arm, thereby facilitating unlocking of said lock mechanism by said kick-off mechanism.

6. A method as recited in claim 5, wherein, during said step (D), said interaction between said brake pedal and said locking mechanism imparts no more than 0.5 lbs of resistance to accelerator pedal motion.

7. A method as recited in claim 5, wherein said step (D) is completed in less than 3" of accelerator pedal stroke from an at-rest position thereof.

8. A method as recited in claim 5, wherein during said step (D), said accelerator pedal engages a kickoff mechanism that is coupled to said locking mechanism.

9. A brake actuator assembly for a park and hold brake system of a vehicle comprising:
(A) a brake pedal which is pivotal under the imposition of manual operating forces from an at-rest position, 1) through an operating stroke in which the vehicle's brake are engaged and in which said brake pedal returns automatically to said at-rest position upon release of the manual operating forces to release the brakes, 2) through a locked position which is located beyond an end of said operating stroke, and 3) to an over-travel position which is located beyond said locked position;

(B) a brake pedal locking mechanism which cooperates with said brake pedal so as to 1) automatically latch said brake pedal in said locked position upon movement of said brake pedal into said locked position, thereby holding the brakes in their engaged condition upon release of the actuating forces and 2) automatically unlatch said brake pedal from said locked position upon movement of said brake pedal into said over-travel position thereby permitting return of said brake pedal to said at-rest position upon release of the actuating forces and releasing the brakes;

(C) an accelerator pedal; and (D) a kickoff mechanism which couples said accelerator pedal to said brake pedal locking mechanism and which actuates said brake pedal locking mechanism to unlatch said brake pedal from said locked position upon actuation of said accelerator pedal;

wherein said locking mechanism comprises a cam on said brake pedal, a cam follower which engages said cam, a control arm which operatively cooperates with said cam follower, and an over-center spring which operatively communicates with both said cam follower and said control arm and which moves through an over-center position upon movement of said brake pedal into said locked position at the end of said operating stroke, thereby changing a biasing direction thereof from one forcing said cam follower downwardly to on drawing said cam follower upwardly.

10. An actuator assembly as recited in claim 9, wherein said cam is formed on said brake pedal and includes an arcuate portion which is engaged by said cam follower when said brake pedal is in said locked position.

11. An actuator assembly as recited in claim 10, wherein said cam follower comprises a swing arm which is positioned adjacent said brake pedal and a roller which is mounted on said swing arm so as to ride along said cam.

12. An actuator assembly as recited in claim 11, wherein a dog is provided on said swing arm and a detent is provided on said control arm, and wherein said locking mechanism is configured so that said dog engages said detent when said brake pedal is in said locked position.

13. An actuator assembly as recited in claim 11, wherein said kick-off mechanism comprises an arm which is mounted on said swing arm and which is engaged by said accelerator pedal upon actuation thereof so as to drive said swing arm to a position in which said swing arm is unlatched from said control arm.

14. An actuator as recited in claim 11, wherein said cam and said roller are configured such that, during unlatching of said brake pedal, said roller rides along said cam in a path that is at least generally tangential to a pivot arc of said swing arm, thereby facilitating unlatching of said brake pedal by said kick-off mechanism.

15. A brake actuator assembly for a park and hold brake system of a vehicle comprising:

(A) a brake pedal which is pivotal, under the imposition of manual operating forces, from an at-rest position, 1) through an operating stroke in which the vehicle's brakes are engaged and in which said brake pedal returns automatically to said at-rest position upon release of the manual operating forces to release the brakes upon release of the actuating forces, 2) through a locked position which is located beyond an end of said operating stroke, and 3) to an over-travel position which is located beyond said locked position; and (B) a brake pedal locking mechanism including a cam on said brake pedal, a cam follower which engages said cam, a control arm which operatively cooperates with said cam follower, and an over-center spring which operatively communicates with both said cam follower and said control arm and which moves trough an over-center position upon movement of said brake pedal into said locked position at the end of said operating stroke position, thereby changing a biasing direction thereof from one pulling said cam follower downwardly to one pulling said cam follower upwardly.

16. An actuator assembly as recited in claim 15, wherein said control arm is mounted on said brake pedal and said cam follower comprises a swing arm which is positioned adjacent said brake pedal and a roller which is mounted on said swing arm so as to ride along said cam.

17. An actuator assembly as recited in claim 16, wherein a dog is provided on said swing arm and a detent is provided on said control arm, and wherein said locking mechanism is configured so that said dog is locked against said detent when said brake pedal is in said locked position.

18. An actuator assembly as recited in claim 17, further comprising a lug on said swing arm and a toggle arm which is mounted on said brake pedal and which selectively cooperates with said lug on said swing arm so as to prevent contact between said dog and said detent until said brake pedal approaches said locked position, thereby providing for single point latching and a single audible indication that the brake pedal has been depressed sufficiently to be latched in said locked position.

19. An actuator assembly as recited in claim 16, wherein said cam and said roller are configured such that, during unlatching of said brake pedal, said roller rides along said cam in a path that is at least generally tangential to a pivot arc of said swing arm during at least a portion of a brake pedal unlatching process, thereby facilitating unlatching of said brake pedal by said kick-off mechanism.

20. An actuator assembly as recited in claim 15, further comprising (A) an accelerator pedal; and (B) a kickoff mechanism which operatively couples said accelerator pedal to said brake pedal locking mechanism and which actuates said brake pedal locking mechanism to unlatch said brake pedal from said locked position upon actuation of said accelerator pedal.

21. An actuator assembly as recited in claim 20, wherein said cam follower comprises a swing arm which is positioned adjacent said brake pedal and a roller which is mounted on said swing arm so as to ride along said cam, and wherein said kick-off mechanism comprises an arm which is mounted on said swing arm and which is engaged by said accelerator pedal upon actuation thereof so as to drive said swing arm to a position in which said over-center spring assumes said over-center position and releases said brake pedal.

22. An actuator assembly as recited in claim 15, further comprising a support bracket on which said brake pedal, said locking mechanism, and said accelerator pedal are mounted such that said brake pedal and accelerator pedal are coaxially pivotal about a first axis and said swing arm is pivotal about a second axis which is parallel to but offset from said first axis.

23. A method of applying and holding a brake of a vehicle comprising:
- (A) manually driving a brake pedal to pivot from an at-rest position and into an operating position; then
- (B) manually driving said brake pedal through said operating position and to a locked position in which a locking mechanism latches said brake pedal in said locked position; then
- (C) releasing said brake pedal while said brake pedal remains in its locked position; then
- (D) unlatching said brake pedal from said locked position by selectively and alternatively
  1) manually driving said brake pedal to an over-travel position which is located beyond said locked position and in which said locking mechanism automatically unlatches said brake pedal, and
  2) manually driving an accelerator pedal into engagement with a kick-off mechanism to automatically manipulate said locking mechanism to unlatch said brake pedal; and then
- (E) permitting said brake pedal to return to said at-rest position.

24. A method as recited in claim 23, wherein, during the step (B), said brake pedal is latchable in only a single locked position thereof and said locking mechanism provides a single audible indication to an operator that said brake pedal has been depressed sufficiently to be latched in said locked position.

25. A method as recited in claim 24, wherein, during said step (B), a control arm on said brake pedal swings into latching contact with a swing arm to latch said brake pedal in said locked position.

26. A method as recited in claim 25, wherein, during the step (B), a dog on said swing engages a detent on said control arm under the assistance of a spring that biases said dog and detent against on another.

27. A method as recited in claim 26, wherein, during said step (A) a toggle arm engages said swing arm so as to hold said dog away from said control arm.

28. A method as recited in claim 26, wherein, during the step (B), said spring moves from a first over-enter position in which it pulls said swing arm downwardly to a second over-center position in which it pulls said swing arm upwardly.

29. A method as recited in claim 26, wherein during the step (D)(2), said accelerator pedal engages said kick-off mechanism and unlatches said brake pedal within three inches of accelerator pedal movement from an at-rest position thereof.

30. A method as recited in claim 25, wherein said control arm swings into latching contact with said swing arm after said brake pedal is released from a position just beyond said locked position.

31. A method as recited in claim 23, wherein said locking mechanism comprises a swing arm and a roller which is mounted on said swing roller, and wherein, during at least a portion of said step (D)(2), said roller rides on a cam of said brake pedal along a path that is at least generally tangential to a pivot arc of said swing arm, thereby facilitating unlatching of said locking mechanism by said lick-off mechanism.

\* \* \* \* \*

UNITED STATES PATENT AND TRADEMARK OFFICE
CERTIFICATE OF CORRECTION

PATENT NO. : 6,907,963 B1
DATED : June 21, 2005
INVENTOR(S) : Donald D. Brown et al.

It is certified that error appears in the above-identified patent and that said Letters Patent is hereby corrected as shown below:

Column 21,
Line 8, replace "matching" with -- unlatching --.

Column 24,
Line 6, replace "trough" with -- through --.

Signed and Sealed this

Second Day of May, 2006

JON W. DUDAS
*Director of the United States Patent and Trademark Office*